United States Patent [19]

Wagner

[11] Patent Number: 4,903,201

[45] Date of Patent: Feb. 20, 1990

[54] AUTOMATED FUTURES TRADING EXCHANGE

[75] Inventor: Susan W. Wagner, Dallas, Tex.

[73] Assignee: World Energy Exchange Corporation, Dallas, Tex.

[21] Appl. No.: 548,319

[22] Filed: Nov. 3, 1983

[51] Int. Cl.⁴ .............................................. G06F 15/30
[52] U.S. Cl. .................................. 364/408; 364/918.8; 364/900
[58] Field of Search ............... 364/200, 900, 300, 408; 340/825.26; 235/375

[56] References Cited

U.S. PATENT DOCUMENTS

| | | | |
|---|---|---|---|
| 3,253,263 | 5/1966 | Lee et al. | 340/172 S |
| 3,573,747 | 4/1971 | Adams et al. | 364/200 X |
| 3,581,072 | 5/1971 | Nymeyer | 235/152 |
| 3,594,503 | 7/1971 | Wolf et al. | 178/88 |
| 3,596,254 | 7/1971 | Highleyman et al. | 340/172.5 |
| 3,652,795 | 3/1972 | Wolf et al. | 179/2 DP |
| 3,753,233 | 8/1973 | Cardell, Jr. | 340/172.5 |
| 3,770,941 | 11/1973 | Gechele et al. | 235/61.7 R |
| 3,848,233 | 11/1974 | Lotan et al. | 364/200 X |
| 3,974,480 | 8/1976 | Gernelle | 364/200 |
| 3,976,840 | 8/1976 | Cleveland | 179/2 DP |
| 4,032,946 | 6/1977 | Wakatsuki et al. | 364/900 |
| 4,264,782 | 4/1981 | Konheim | 364/200 X |
| 4,275,456 | 6/1981 | Tanaka et al. | 364/900 |
| 4,321,672 | 3/1982 | Braun et al. | 364/408 |
| 4,334,270 | 6/1982 | Towers | 364/300 |
| 4,346,442 | 8/1982 | Musmanno | 364/408 |
| 4,376,978 | 3/1983 | Musmanno | 364/408 |
| 4,412,287 | 10/1983 | Braddock, III | 364/408 |
| 4,554,418 | 11/1985 | Toy | 364/900 |

OTHER PUBLICATIONS

*Wall Street Journal,* "Amex, Toronto Exchange Develop a Plan to Link Trading Floors Electronically", date not known.

*Info World,* "Buying Stocks On-Line", 9/17/84, pp. 31–32.

"Trading System Falling Apart; Will Exchanges Automate?", undated article from magazine of unknown origins.

*Primary Examiner*—Jerry Smith
*Assistant Examiner*—Jon D. Grossman
*Attorney, Agent, or Firm*—Sigalos, Levine & Montgomery

[57] ABSTRACT

A computerized open outcry exchange system for transacting sales of a particular futures commodity contract by members of a futures trading exchange wherein bids to purchase or offers to sell the particular commodity contract are made by the members through remote terminals and the exchange computer automatically matches offers and bids to complete the transaction.

42 Claims, No Drawings

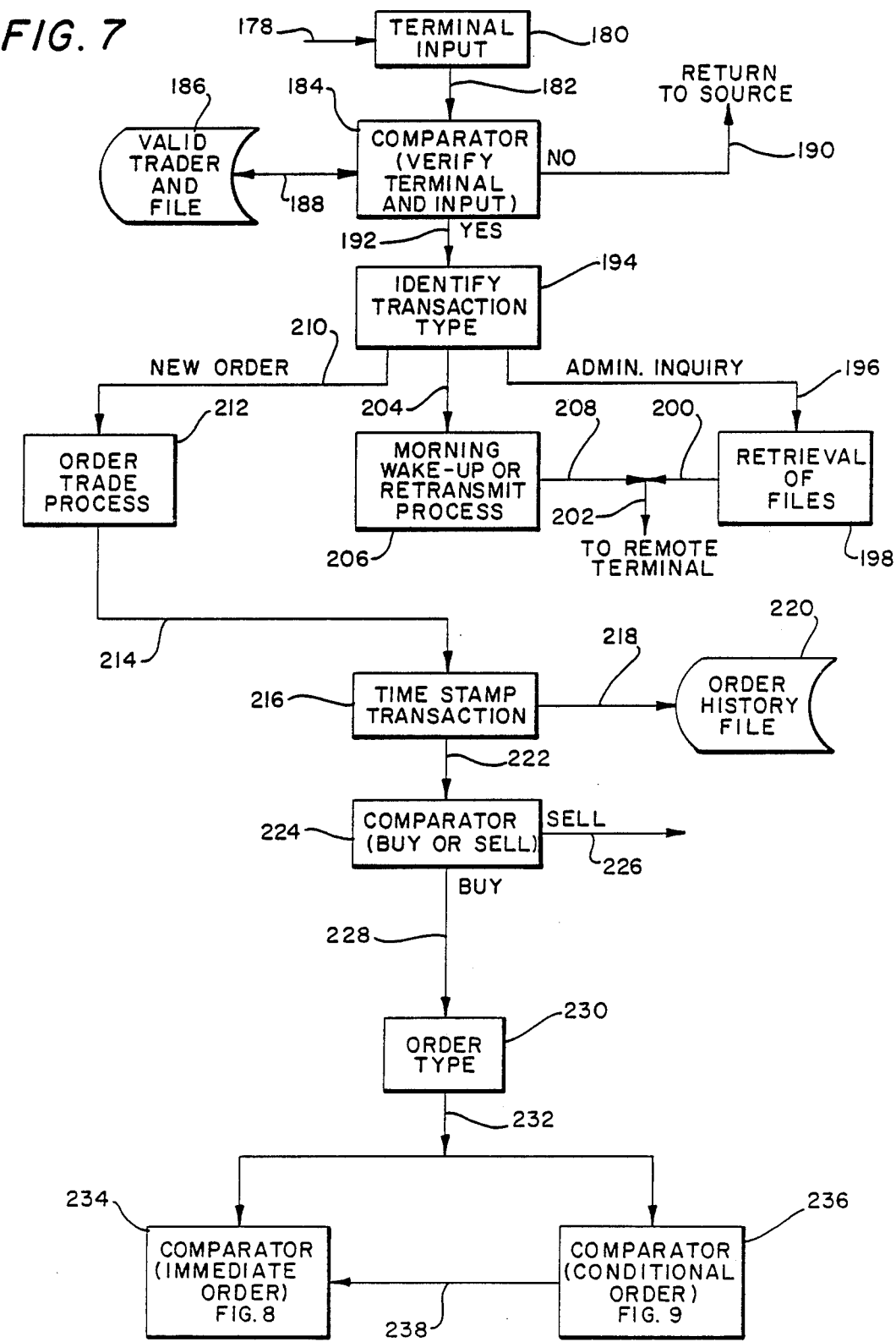

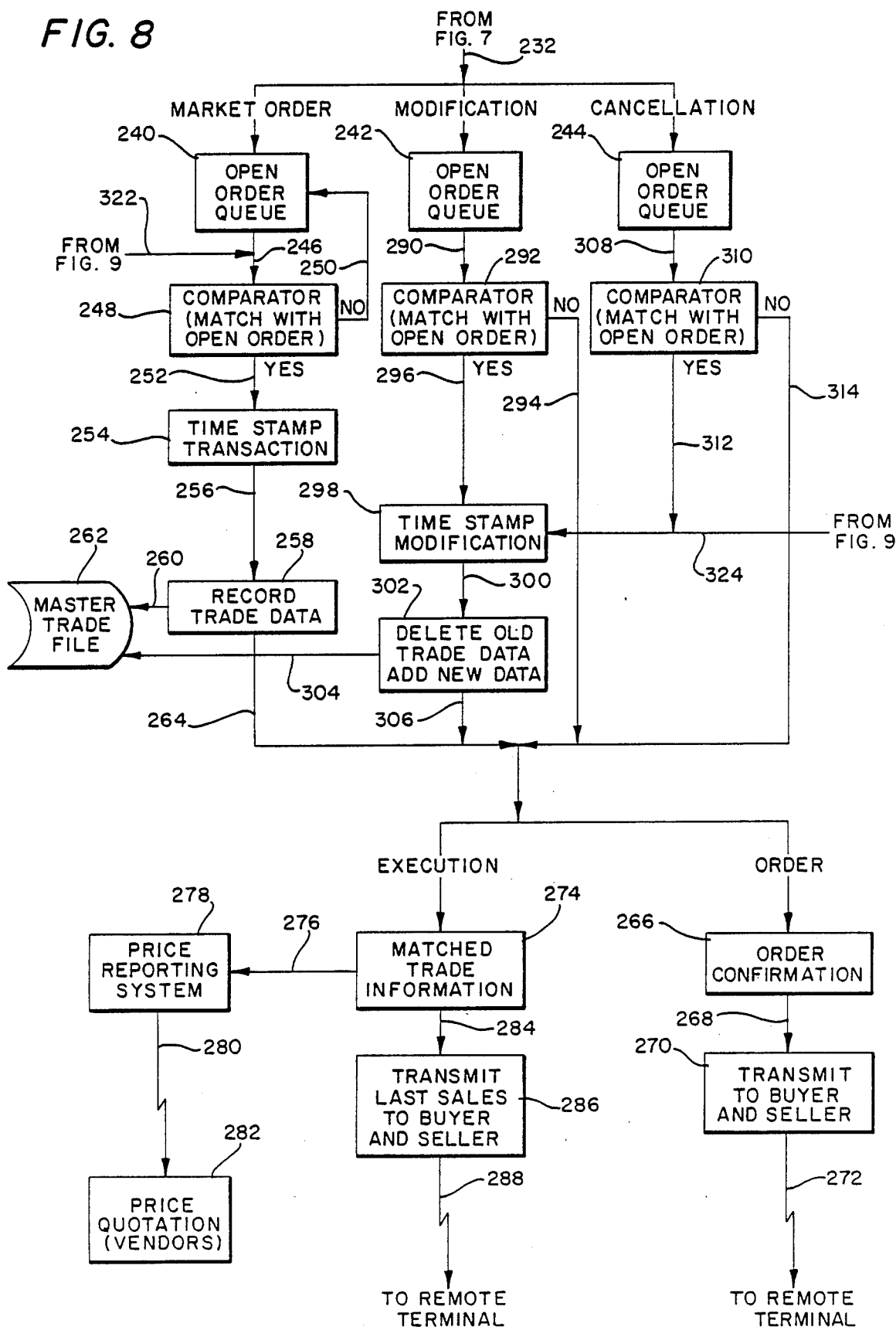

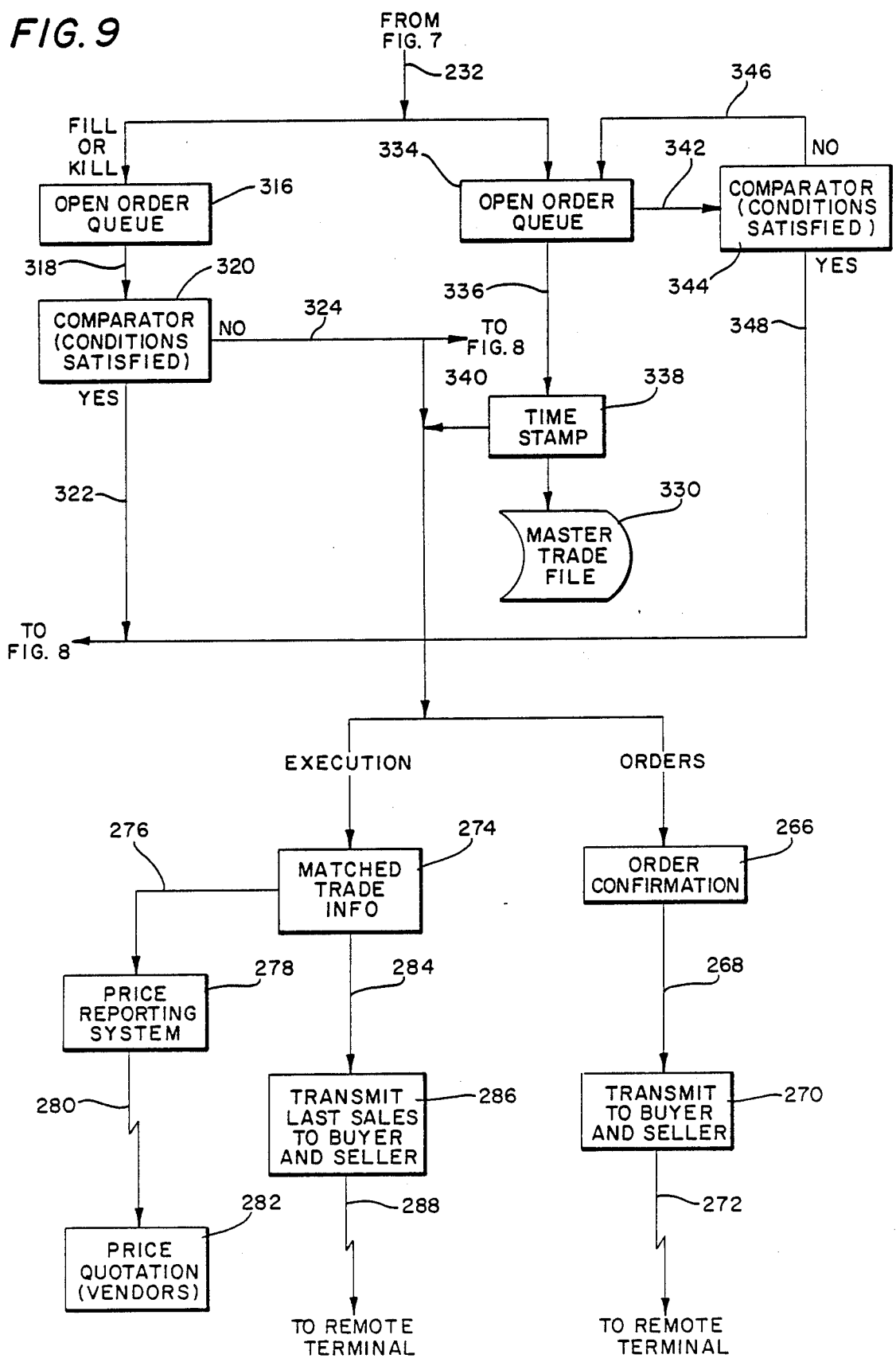

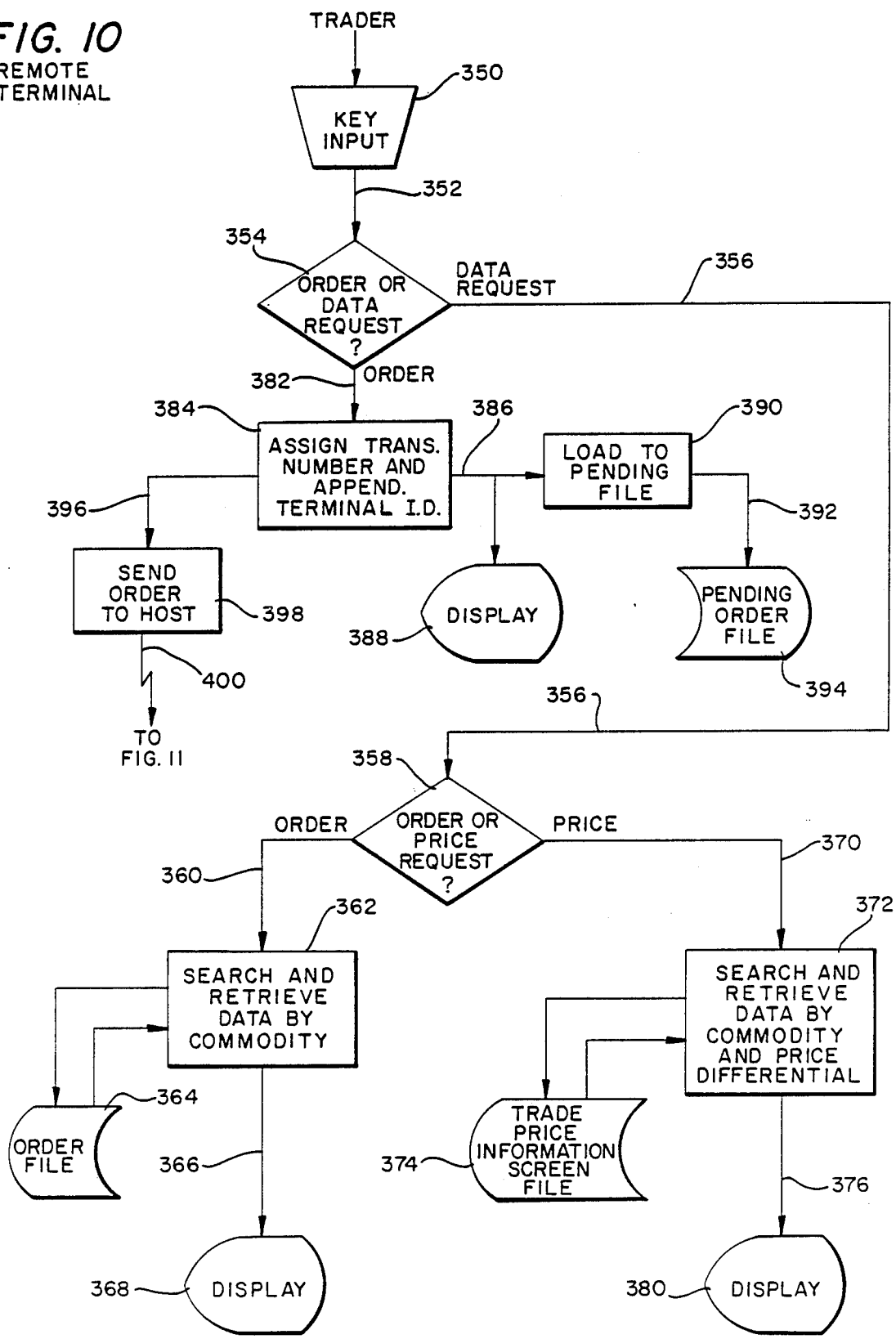

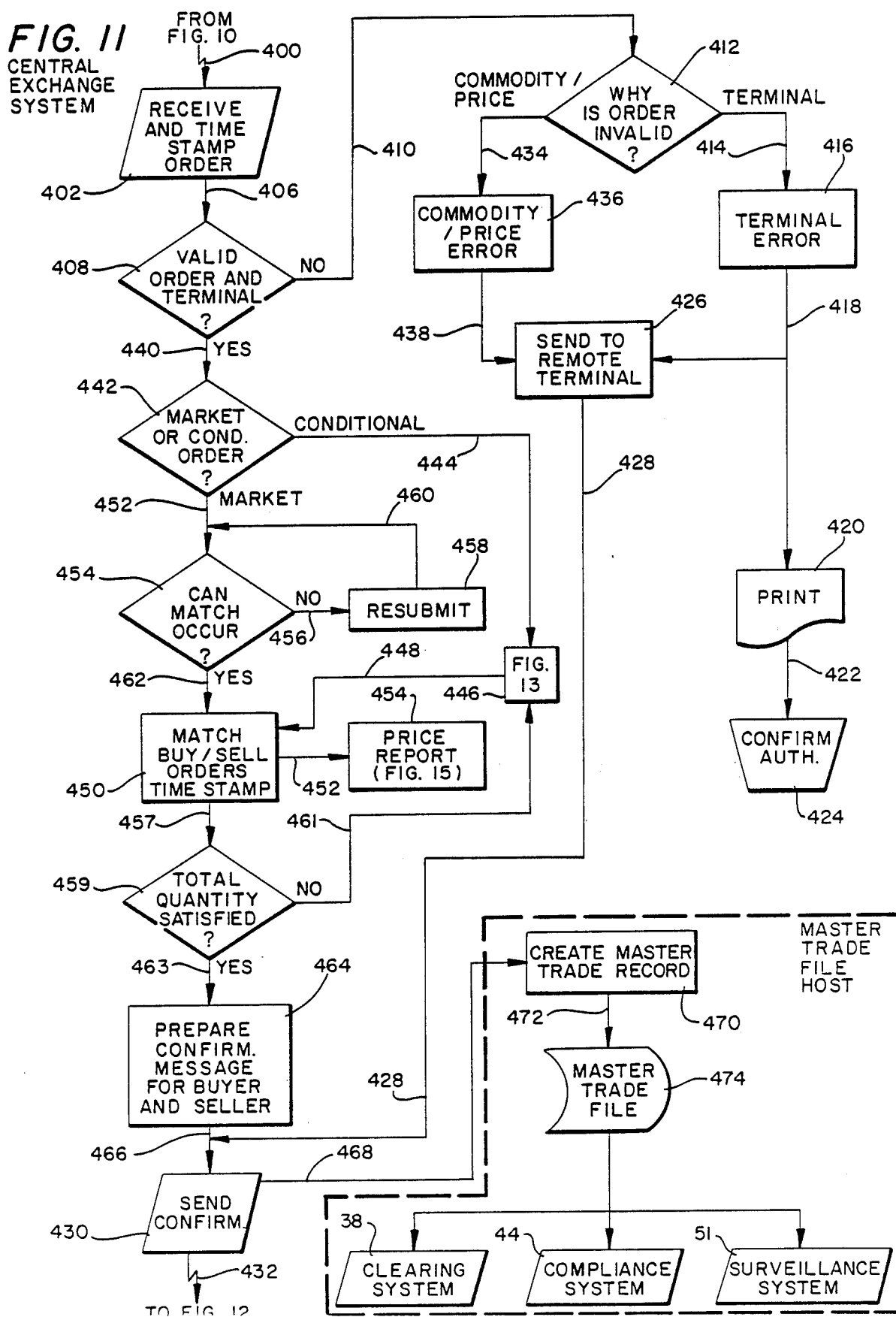

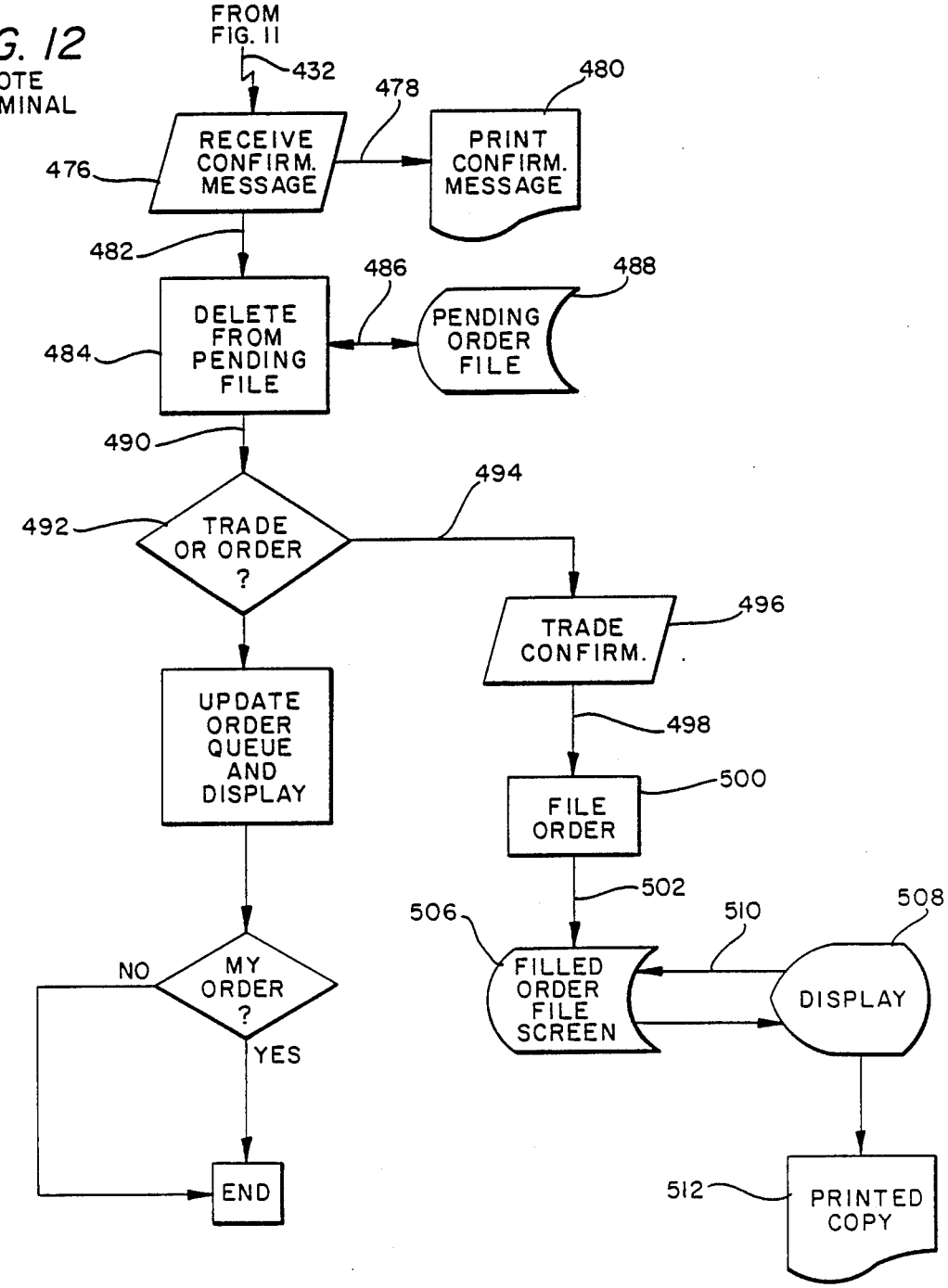

ORDER QUEUE-HOST

AUTOMATIC UPDATING PROCESS-HOST

PRICE REPORTING PROCESS

AUTOMATED FUTURES TRADING EXCHANGE

FIELD OF THE INVENTION

The present invention relates to a futures trading exchange and in particular to an automated open outcry futures trading exchange having a central processor associated with one or more remote terminals through which trades can be made by members of the exchange who enter offers or bids at the remote terminal and couple them to a central processor which compares any bid with offers on a priority basis, finds a match and completes the execution of the transaction.

The major purpose of the futures marketplace is to provide a facility whereby large numbers of people can make bids and offers through a central location on a commodity contract in order to determine its market value. A second purpose of the futures market is to spread the risk of price changes in a business from a small group of people to a larger group of people. This process is known as risk management. The reason the risk can be spread is that speculators, in addition to hedgers, enter the market and provide liquidity when they recognize an economic benefit from changes in the prices of commodity contracts. The larger number of participants allows a hedger to identify a price level which takes into account his cost of doing business and his desired profit level and then to lock-in a price level by offsetting losses in the cash market with equal gains in the futures market. All of this must be done in such a way as to minimize fraud and manipulation of the marketplace and is conducted with the oversight of and under the direction of the federal government which establishes the required rules and regulations.

BACKGROUND OF THE INVENTION

The method or process of trading futures contracts has remained virtually the same since the markets first opened in the 1800's. Use of state of the art technology in present systems has been limited thus resulting in major inefficiencies and opportunities for abuse. The futures trading system and markets, as they exist today, are the remnants of an archaic system. When an investor (hedger or speculator) wishes to trade on any of the futures exchanges, he is many times removed from access to firsthand trade data unless he is a floor trader. He must first call his broker who may have a direct line to a floor clerk but, generally, must call the trading room of the broker headquarters. The trading room calls the floor clerk who in turn relays the information to a runner. The runner relays the request for information or execution of a trade to the floor trader. The floor trader stands in a "pit" and executes a trade by shouting out his offer to sell, or buy, until someone across the pit signals that they will take the offered price (bid). When a trader thinks he has made a trade, he marks a trading card and a portion of the card is given to the exchange to begin the clearing process or accounting and funds collection process. This is known as the "open outcry" system because trading takes place in a central location in open view of a variety of participants. Most exchanges require that the trader enter the trade within one-half hour of the time a trade has been executed.

As can be imagined, there are many problems with the present archaic system. The markets were originally designed when there were a relatively few number of people who wished to participate in the process. As the number of participants have increased, it has meant that those who are directly on the floor of an exchange are at a distinct advantage over those who are not physically present. First, when a customer asks a question as to what is taking place, the question is relayed through four or five people. An answer to a question is at most subjective because it is based on the observation of those who are on the floor. The floor trader will tell what he thinks is happening but he does not have the tools to be sure that his observation is correct. The advantage that a floor trader has is that if his observation is not correct, he can make an additional trade to correct the situation for himself. But a retail broker or customer may not be advised of a change and at worst may simply be given inaccurate information.

The opportunity for mistake or abuse has been acknowledged by regulators and exchanges alike. As the system presently exists, trades are not confirmed until after an exchange is closed for the day. Therefore, if a floor trader has traded in front of a customer in order to obtain a better price or has failed to execute a trade for fraudulent reasons, it is difficult to detect. Even when a trade has been properly executed the opportunity for abuse or mistakes is still high as will be discussed hereinafter.

On a traditional exchange, after a trade is made a card is handed to an exchange employee who then keypunches the data into the computer. At the same time trading cards must be manually sorted to match trades. At the end of the day the computer lists are checked against the trading cards to reach agreement as to the trades which have been made. As can be well understood, there, first, may have been a mistake in the keypunching process. Secondly, there may be a difference given in the two cards as to the price at which a trade was made and thirdly because the trades are based on eye contact, there may be a difference in opinion as to whether a trade was actually made at all. When there is disagreement, a list of "out trades" is made and agreement must be reached as to whether the trade was made at all and if so at what price. The nature of the discrepancy determines whether the trader, the broker, or the customer must bear the cost of an out trade. Again, because the customer is at a lengthy distance, he is at a disadvantage because he takes no part in the resolution process.

The accounting process also has its problems. Once the matching of trades takes place, the information is fed into the clearing process of an exchange. The present clearing process in most exchanges is a computerized process. However, since information is manually entered, after the fact of the trade, its value lies only in the accounting process and not in the control of the exchange process. The exchange only knows at the end of the day if a trader has exceeded his position limits or has incorrectly identified a clearing member or has provided other incorrect information. On most exchanges 300 to 400 individuals are required to process trading cards and complete the clearing function.

The surveillance of the system as it now exists (to insure proper operation and minimize mistakes and abuse) also has numerous problems. Surveillance is completed on existing exchanges through live observation. An exchange employee stands in the middle of a ring and observes trading as it takes place. With close to a 1,000 people on the floor of an exchange, observation is spotty at best. Some exchanges have programs for detecting illegal trade practices which are repetitive but even when such practices are detected often the information available as evidence is inaccurate and unreliable.

The present invention, the automated futures trade exchange, has created an entire automated process for trading futures contracts which provides accurate and precise information, trading based on factual data, assurance of execution and immediate confirmation of the contracts, control through real time processing of information and electronic surveillance, and the use of computer hardware to implement the process. It does not separate clearing and surveillance from the futures trading process as do other exchanges because it is the combined process which allows the markets to function properly.

All trading conducted on the automated futures trading system will be effected through a central computer complex programmed to handle orders for the exchange's futures contracts. Access to this central computer will be available only through specially programmed remote computer terminals which will be distributed only to exchange members who will have a coded membership number. Each remote terminal will consist of a keyboard, a printer, on-line storage and a video monitor, the latter displaying a variety of information regarding the futures contracts traded on the exchange. Members will be able to utilize these terminals to transmit to the central computer bids and offers for their own accounts as principals or for the accounts of customers for whom they are agents. However, the system does not allow direct negotiations between members of the exchange as in the system disclosed in U.S. Pat. No. 3,573,747. Instead, the system acts as an intermediary among members and matches bids and offers and completes the transaction. Thus, the present novel system is an open outcry system since trading takes place in a central location in open view of a variety of participants.

When an order is transmitted to the central computer, its pertinent characteristics will be recorded including quantity, price, the time that the order was placed, and the capacity in which the order is entered; that is, whether as agent or principal. The exchange central computer will retain all orders received, arranging each bid and offer on the basis of its price, quantity and entry time and displaying all bids in descending order of price and all offers in ascending order of price. Thus, each bid or offer will become part of the market data displayed in every member's remote terminal video monitor. The breadth of the market will also be indicated. That is, whether a bid of 200 contracts represents one offer to buy 200 contracts or 20 offers to buy 10 contracts.

In addition, the video monitor of each remote terminal will display lot sizes, last sale prices, daily price ranges, the volume for each contract month, the spread relationships or price differential among the various contract months, and allows simultaneous spread trades (both in time and by commodity) to take place.

Pertinent to this process is the capability to modify prices at a remote terminal by moving a cursor on the video display to the bid or offer desired to be modified by the user which modification is then accomplished through the keyboard. The capability to see the display of buys and sells is analogous to the open outcry system of trading and is pertinent to good trading because it shows the supply and demand in the market. On the floor of an existing exchange, a trader would have a "feel" for the market but would not be able to relay to a customer with any degree of accuracy information pertaining to the distribution of bids and offers.

The exchange central computer will automatically match equal bids and offers on a first come, first served basis thereby executing the transaction. Each transaction execution will be immediately confirmed to the members on both sides of the trade by the printing mechanisms of those members terminals. Each execution report will include information regarding the date, time, quantity and price of the transaction. The exchange central computer will be able to handle a full array of futures orders including straddles, limit orders and stop orders. Because bids and offers are transmitted from the remote terminals directly into the computer there will be no chance for an "out trade", that case where a trade is made but the bid and offer do not match. Moreover, because trading will be effected solely by the computer, a record will exist of the precise time each order was entered, the precise time it was executed and the precise time an execution report was transmitted.

Another important factor in trading is the capability to determine the liquidity of the market. Again, on the floor of an exchange a trader may note that trading is active but by the time information is relayed back and forth between the principal and the trader the price may have moved considerably or the bids and offers may no longer be present. No presently existing exchange can determine with accuracy during the trading the volume of trading immediately taking place. The present system will record trades exactly as they are made, when they are made, and thus a member would be able to determine the volume of trading taking place at any particular time and would have the information necessary to determine whether it is likely that he can come in and out of the market at his desired price level.

Each terminal on the system will be specifically designated to trade a certain number of contracts. Position limits for each principal are thus determined by the fiduciary capabilities of the participant. Under the present system of trading on exchanges, a member may execute trades far in excess of his limit without detection by the exchange. In the present trading system, limits will be programmed into each individual terminal thus further eliminating the possibility of "out trades" because an individual trader has exceeded his limits. During trading times live surveillance of the market will take place through control terminals at the exchange. Information may be fed directly into the surveillance system to detect the patterns of trading which may be manipulative and since all information is recorded as trading takes place, accuracy is assured.

All information from the trading system will be moved directly to the clearing system. Thus, there is no manual matching of trades and accuracy of the data is assured. Earlier and more rapid transfer of funds will be possible thus increasing the financial viability of the exchange as a whole.

It has been recognized for some time in the futures industry that multiple factors determine the pricing of commodities. Thus, the use of computerized analysis has rapidly developed and multiple tools for graphing and receiving information has been developed. But the process for trading and processing trades remains archaic. The present system provides a means of executing trades, validating the information, and notifying parties of pertinent changes without bias to those who participate. Thus, a larger more efficient marketplace may be accommodated at lower cost.

SUMMARY OF THE PRESENT INVENTION

The present invention relates to a computerized open outcry trading exchange system for transacting sales of futures commodity contracts in varying volumes or lot sizes by members of the trading system as principals or agents for others wherein bids to purchase or offers to sell a particular commodity are made by said principals or agents through remote terminals, said system comprising a trading system for receiving buyer bids and seller offers on a particular commodity contract from said remote terminals and automatically completing a transaction of matching bids and offers, a clearing system for establishing requirements and regulations to be observed on said buy and sell transactions, means coupling said clearing system to said trading system for determining the validity of each transaction by comparing said transaction to said requirements and regulations, a compliance system for establishing predetermined criteria necessary to detect illegal trade practices or trade patterns which would adversely affect said commodity market and means coupling said compliance system to said trading system and said clearance system for automatically comparing said transaction to said predetermined criteria thereby enabling detection of illegal trade practices and trade patterns which would adversely affect said commodity market.

The invention also relates to a method for automated futures trading in which the transaction of a sale of a particular futures commodity in varying volumes or lot sizes by members of a futures trading exchange as principals or agents for others wherein bids to purchase or offers to sell are made by said principals or agents for said particular commodity, said method comprising the steps of establishing a trading system for receiving at a central processor buyer bids and seller offers on a particular commodity from remote terminals, storing in said central processor said trade orders in the form of time, price and quantity of each of said received bids and offers, comparing said received bids and offers and matching equal bids and offers on a first come, first served basis according to the time of receiving said bids and offers, forming a clearing system for establishing buy and sell constraints on each member of said exchange, coupling said clearing system to said trading system for approving execution of a transaction only when said transaction falls within said predetermined constraints, executing the buy and sell transaction of said commodity having its offer and bid matched and approved by said clearing system forming a compliance system for establishing predetermined criteria necessary to detect illegal trade practices, coupling said compliance system to said trading system and said clearing system for detecting any illegal trade practices as indicated by said predetermined criteria, and confirming the execution of the transaction immediately to both buyer and seller whose bid and offer is matched.

BRIEF DESCRIPTION CF THE DRAWINGS

These and other more detailed objects and advantages of the present invention will be seen in relation to the accompanying drawings in which.

DETAILED DESCRIPTION OF THE DRAWINGS

Figure 1:
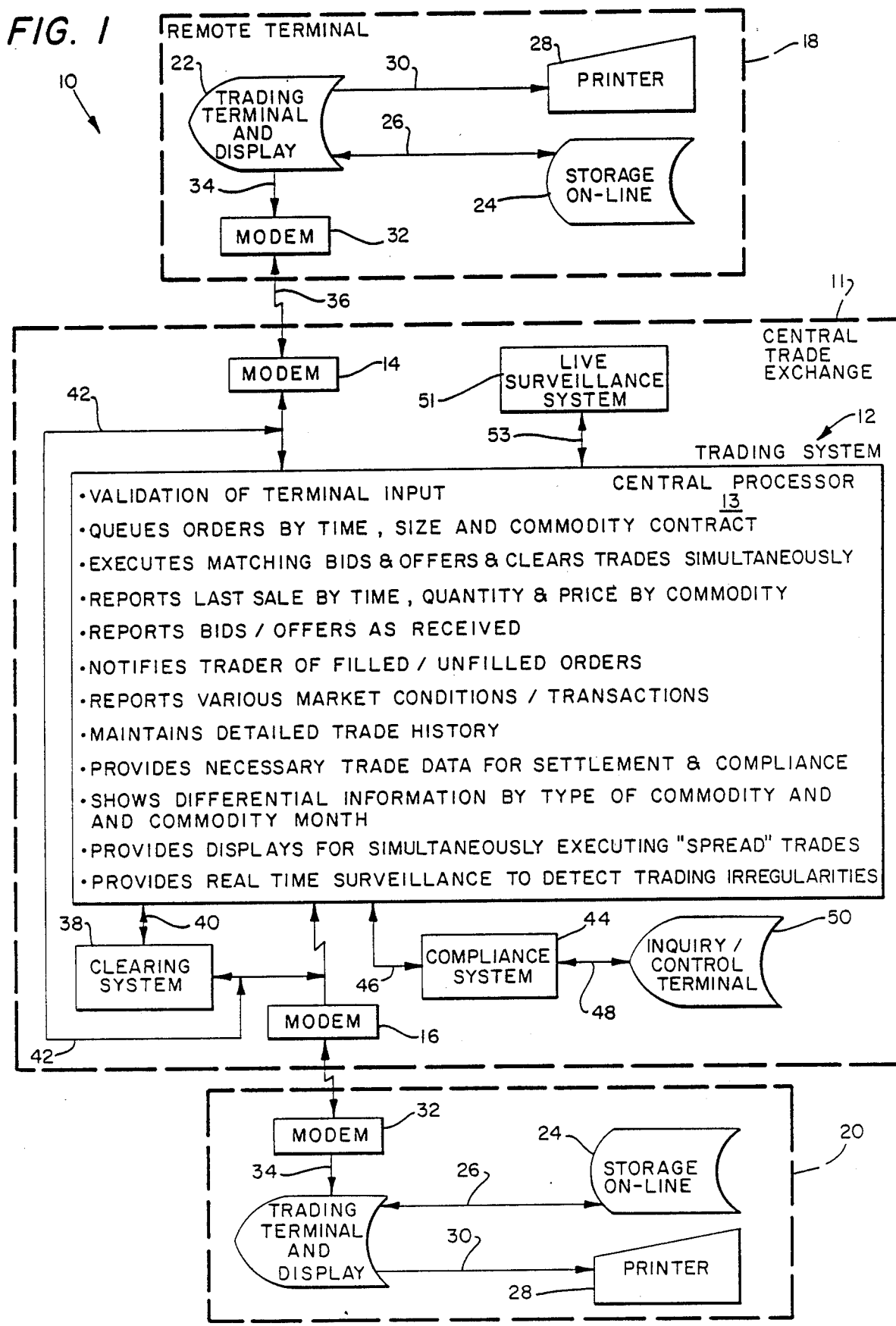
FIG. 1 is a diagrammatic representation of the novel automated futures trading system.

FIG. 1 is a diagrammatic representation of the novel automated futures trading exchange generally designated by the numeral 10. It includes a central exchange 11 having a trading system 12 including a host or central processor 13 coupled through modems 14 and 16 to remote terminals 18 and 20. The remote terminals 18 and 20 may be either "smart" terminals or "dumb" terminals. Thus, if remote terminal 18 is a "smart" terminal, it may include a microprocessor 22 which would include a keyboard and a display for text editing which is associated with a memory or storage unit 24 through connection 26, a printer 28 through connection 30 and an output on connection 34 to modem 32. The output of modem 32 may be transmitted on common communication lines 36 to the modem 14 on the premises of central exchange 11.

The central processor of trading system 12 of the central exchange 11 receives bids or orders from the remote terminals 18 and 20. It is obvious that any number of remote terminals 18 and 20 may be used but for simplicity of the drawings and discussion thereof, only two of the remote terminals 18 and 20 are shown in FIG. 1. Each of the remote terminals 18 and 20 will be in the possession of an exchange member and are given an identification number for that member. The identification number must be entered into the system by the remote terminal 18 or 20 before the central processor of trading system 12 will accept the data from it. Thus, the central processor of trading system 12 validates each terminal input by checking the terminal identification number. If the identification number is correct, the central processor of trading system 12 stores the order in its memory queue by time, quantity and contract price. It then executes matching bids and offers and clears the trades simultaneously. The central processor of trading system 12 also reports the last sale by time, quantity and price by commodity or contract. It also reports all bids and offers as they are received and notifies the traders at the remote terminals of filled or unfilled orders. It can access its memory to report various market conditions and transactions and maintains a detailed trade history for each trade member. Finally, it provides the necessary trade data for settlement and compliance with the rules of the exchange.

A clearing system 38 receives data from the central computer of trading system 12 on connection 40 and clears all trades based upon exchange rules and the like as will be discussed more completely hereinafter in relation to FIG. 2. The output of the clearing system 38 is coupled to the output of the central processor of trading system 12 on line 42 for transmission as needed through modems 14 and 16 to the remote exchanges 18 and 20 respectively. In like manner, a compliance system 44 receives data from the central computer of trading system 12 on connection 46 and checks that data to see if it meets predetermined limits or requirements established for each exchange member. It also provides information on connection 48 to inquiry terminals 50 to answer inquiries from exchange officers who ensure that the system rules are being complied with. This will be discussed more fully hereinafter with relation to FIG. 2. A surveillance system 51 is coupled to the central processor 12 by connection 53 to enable exchange officers to review all information relating to trading.

Figure 2:
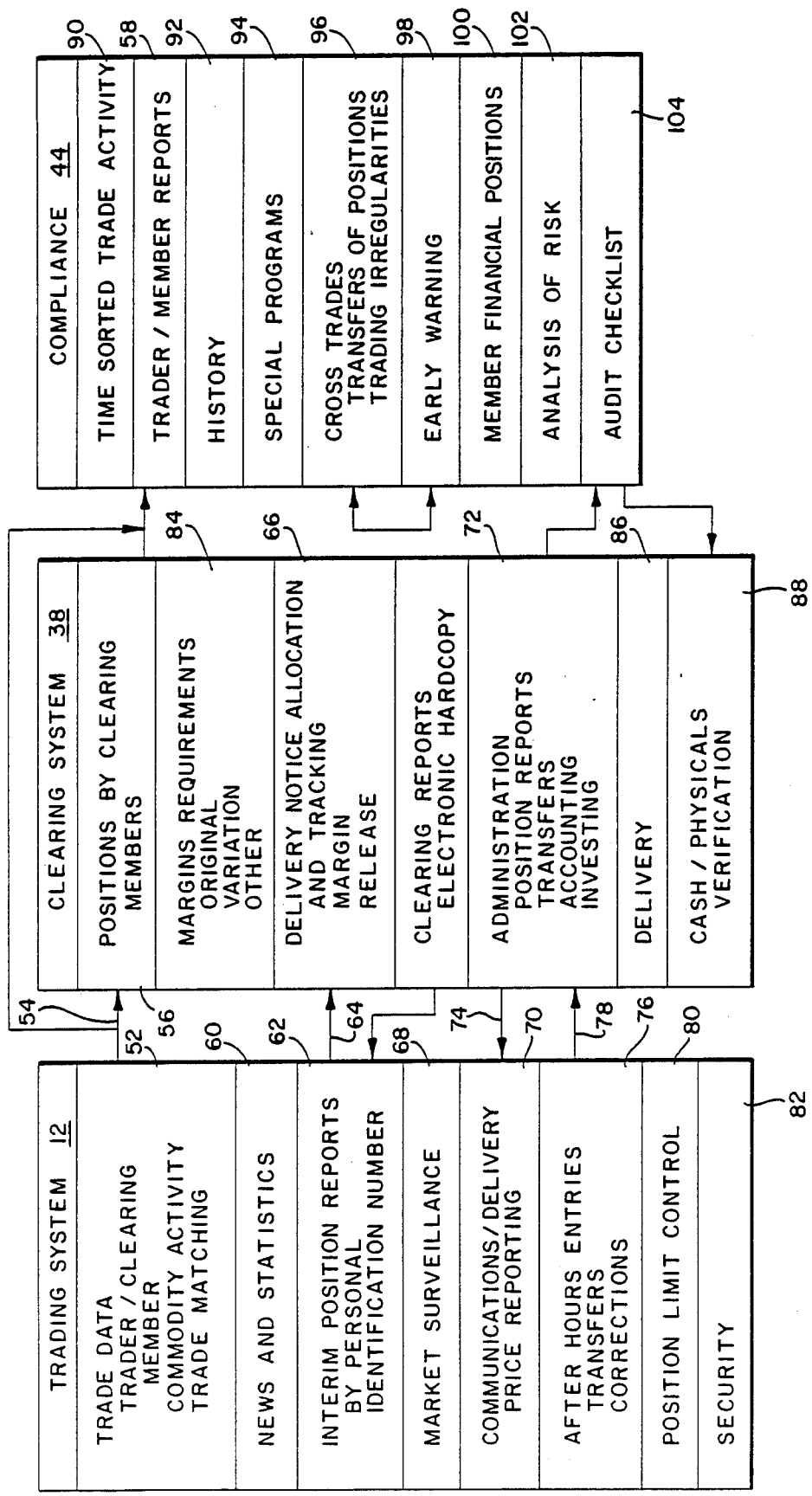
FIG. 2 is a chart showing the relationship of the trading system to the clearance system and the compliance system.

FIG. 2 is a chart illustrating the systems relationships among the trading system 12, the clearing system 38 and the compliance system 44.

Thus, the trading system 12 receives the trade data and verifies the validity of the terminal submitting the data by terminal identification number or broker number as shown in block 52. It also stores data relating to the activity of any particular commodity so that all information as to what is happening immediately to that commodity is available. Also it does trade matching by surveying all bids and all offers and finding a match, if one exists, between the bids and offers. It also coupled the trading information through connection 54 to the clearing system 38 as illustrated by block 56 so that the clearing system can determine the position of each member. Inasmuch as each member is limited in the amount of trading that can be done, the clearing system 38 is constantly checking so that the limitations cannot be violated. In addition, the output of the trading system 12 from block 52 on line 54 is also coupled to the compliance system 44 to block 58 in order that traders or member's activities can be monitored and reports can be compiled illustrating the actual trades of each of the members or traders.

Also, the trading system 12 will provide news and statistics relating to a particular commodity such as movement of oil, changes in prices and the like as well as a morning market report as illustrated by block 60.

In addition, the trading system 12, as represented in block 62, provides for each remote terminal the number of trades open and outstanding and thus provides interim position reports by personal identification number of the trader or member. That information is also coupled on line 64 to block 66 of the clearing system 38 which makes preparation for delivery notice and allocation and tracking and thus keeps track of what orders were received from whom and sold to whom, where and the like. In addition it keeps track of the margins or monies required relative to delivery of commodities. It also provides for a release to the exchange when the plans of both the buyer and the seller change. Further, the trading system 12 provides for market surveillance which allows exchange officers to monitor all trades taking place so that any peculiarities in trading can be detected thus preventing fraudulent trades or manipulations of the market.

Also, as represented by block 70 in the trading system 12 of FIG. 2, the trading system 12 can provide communications with traders or members through their remote terminals and report delivery of commodities and any commodity pricing information to any trader or member. In addition, the trading system 12 can receive administrative position reports and transfers from the clearing system 38 in block 72 on line 74 and communicate that information to traders or members. Also, as represented by block 76 in the trading system 12, after hours entrys including housekeeping functions, such as transfers and corrections, can be sent to block 72 of the clearing system 38 on line 78 so that the clearing system 38 can use that information for accounting, investing and the like.

In addition, the trading system 12 can provide position limit controls for the members or traders as illustrated by block 80 and thus keep track of the amount of trading that any one particular terminal is allowed to handle. Finally, as represented by block 82 of the trading system 12, security of the system can be maintained as, for instance, checking the number of the terminals on the line and their identification numbers.

In regard to the clearing system 38, as stated earlier, block 56 receives data on trading from the trading system block 52 and keeps track of the trading positions of each of the members. Also, as represented by block 84 in the clearing system 38, margin requirements for each of the members are maintained, so that the margin requirements are tabulated and kept on file. Further, as shown in block 72, the accounting functions are maintained by the clearing system 38.

When actual delivery of commodities is required, the clearing system 38 keeps note of that information as represented in block 86. Finally, as represented in block 88 the clearing system maintains a file of physical verifications of what took place over some period of time as for instance whether actual deliveries of commodities were made or the trade was just a paper exchange.

The compliance system 44 as represented in block 90 keeps track of the time sorted trade activity for any particular trader or clearing member. Thus, a file history of each trader is maintained.

Also, as stated earlier, the compliance system 44 as represented by block 58 provides trader member reports on all of their activity so that this activity can be monitored.

In addition, as represented by block 92, a complete history of all trades of any particular trader is maintained including the date of the trade, the price of the trade, the quantity, the commodity and the like.

Block 94 of the compliance system 44 relates to special programs which may be maintained for special problems which are to be monitored for compliance. In addition, block 96 of compliance system 44 represents a monitor for patterns to enable detection of trading irregularities, transfer of positions, cross trades and the like. Also, as represented by block 98, the financial condition of each member is maintained and a warning of a dangerous financial condition of a member is provided for monitoring purposes. This history of record of the members' financial positions as traders is recorded as represented by block 100 for monitoring by exchange officers. In addition, block 102 represents the position of the traders relative to their net worth and thus enables the trade exchange officers to analyze the risk involved in allowing a trader to operate in the system under certain limits which are set. Finally, block 104 represents a check list of certain factors relating to each trade exchange member to assure that they are in compliance with the regulations established by the exchange.

Thus, as can be seen in FIG. 2 the trading system 12, clearing system 38, and compliance system 44 work with each other to transact trades, monitor the operation of the exchange, ensure that all traders are operating within preset parameters, and maintain a history of the operation during the automated processing so that compliance with preset conditions is maintained and the trading history of each member is reviewable.

Figure 3:
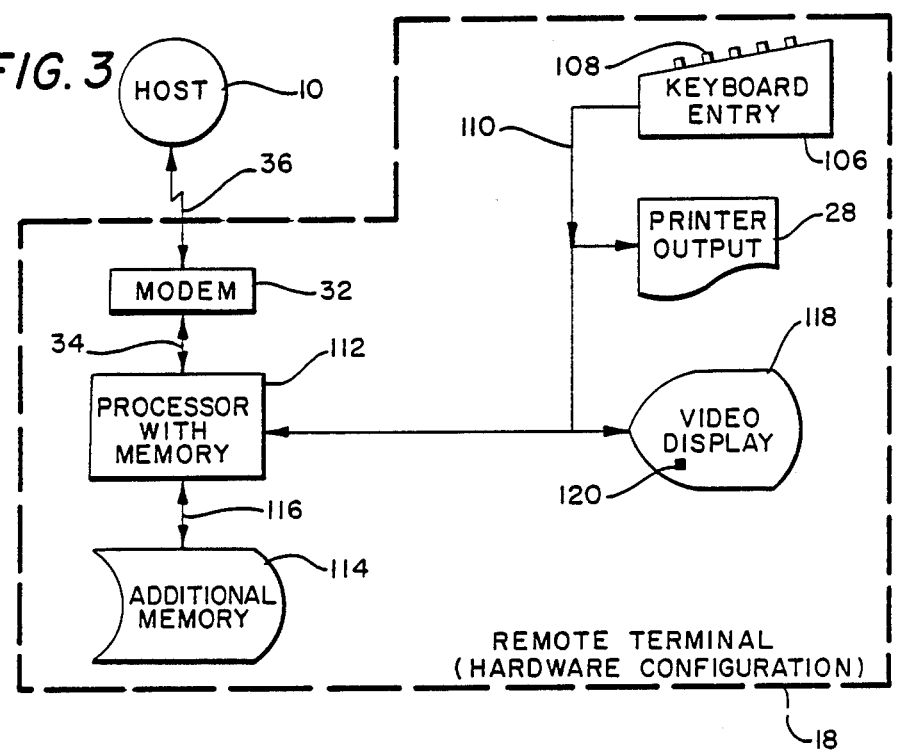
FIG. 3 is a diagrammatic representation of the hardware configuration of the remote terminal for the trader who may be a principal or agent.

FIG. 3 is a diagrammatic representation of a remote terminal 18 which is coupled by a local communication lines 36 to a host or central processor of the trading system 12 of the futures trading exchange 10 shown in FIG. 1. The remote terminal 18 includes a keyboard 106 having keys 108 for the entry of data and which produces output signals on line 110 which is coupled to a terminal 112. As stated earlier, the terminal may be either a "dumb" terminal or a "smart" terminal. If it is a smart terminal, it may be a microprocessor having its own internal memory as well as additional external memory 114 coupled thereto by means of lines 116 which may be used for additional storage. The information stored by the terminal 112 may be displayed by video display 118 or printed by printer 28. Video display 118 has thereon a cursor 120 which is movable by activation of certain of the keys 108 on keyboard 106. When the processor 112 receives information from the central processor in the futures exchange system 10, it arranges the received bids or offers on the basis of price and the time received by the central processor and displays in the remote terminal 118 the arranged bids and offers and displays all bids in descending price order and all offers in ascending price order. If the user's bid or offer needs to be modified, the movable cursor 120 on the display 118 may be moved along the displayed bids and offers of the user and the data therein modified through keyboard keys 108. All of that information is, of course, stored in the terminal 112 and associated memory 114. The communication that needs to take place with the trading system 10 is done on line 34, through modem 32 and local communication lines 36 to the central processor in the trading system 12 of futures trading exchange 10.

Figure 4:
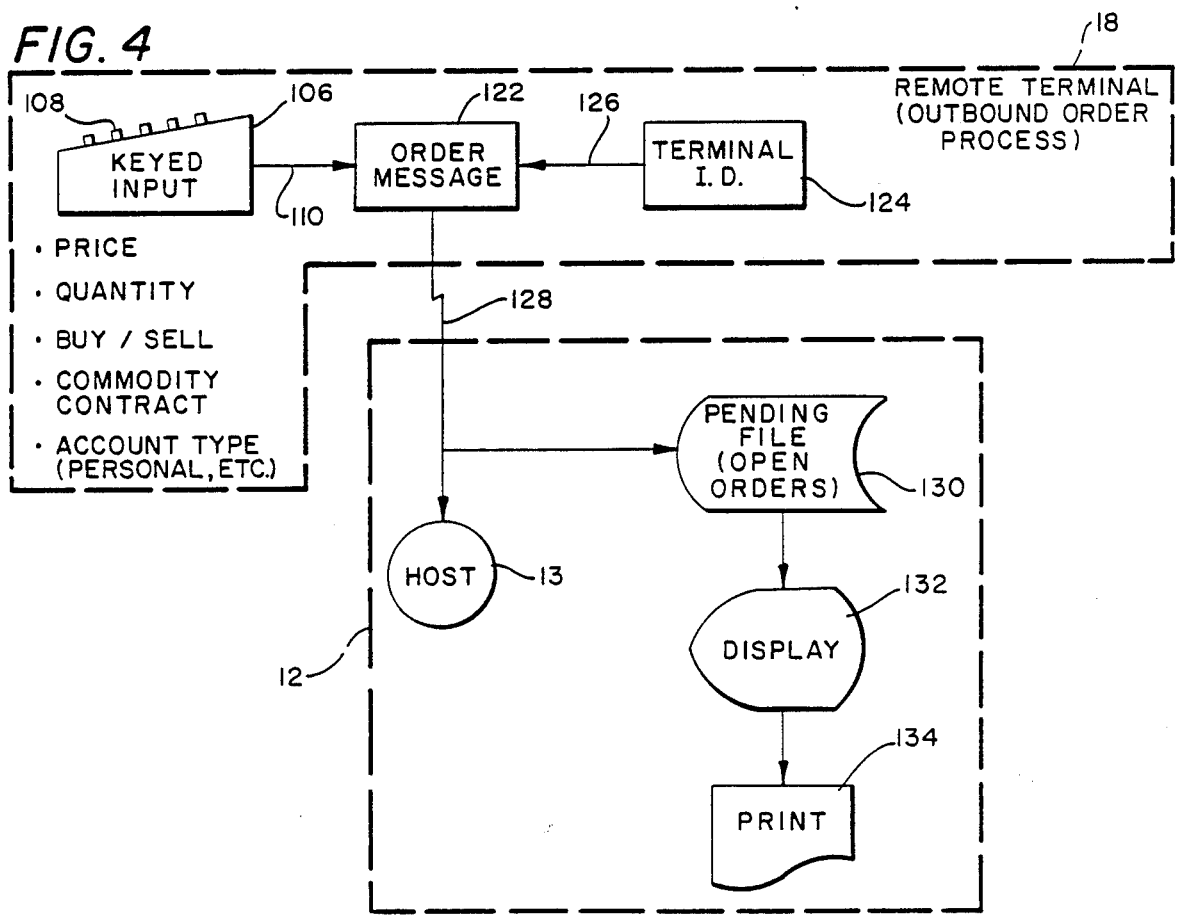
FIG. 4 is a diagrammatic representation of the remote terminal sending an order to the central terminal or host computer in the trading system.

An example of a system for operating from a remote terminal 18 to the central processor 13 of the automated trading system 12 is illustrated diagrammatically in FIG. 4. The order is keyed into the system through keyboard 106 and keys 108 thereon. The information typed into the system would include price, quantity, whether it is a buy or sell order, the type of contract (commodity type), the account type (whether its personal, customer, broker, and so forth) and the identification of the clearing member (or whether the buyer or seller is sponsored by a clearing member). This information is coupled in code via connection 110 to the processing unit 122. Also coupled to processing system 122 is code unit 124 which automatically produces a terminal identification signal on connection 126 which is transmitted first by the processing unit 122 on local transmission lines 128 to the host or central processor 13 of the trading system 12. The terminal I.D. number may include the account type (the terminal identification number), the clearing member identification number, the trader identification, and transaction number. The central computer 13 processes this order and stores it in the pending file 130 of its memory. It can also display the information on display 132 and print it with printer 134.

Figure 5:
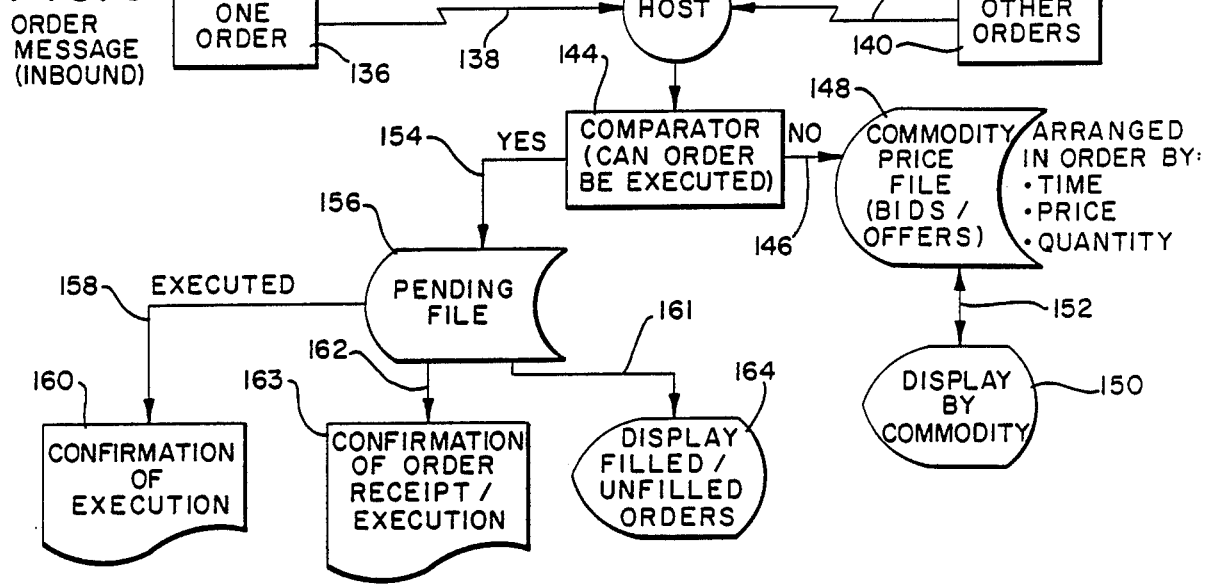
FIG. 5 is a diagrammatic representation of the host or central computer in the trading receiving orders from a multiplicity of terminals and processing those orders.

The details of the processing of the incoming order by the central processor 13 is shown in FIG. 5. In addition to one order being generated by a remote terminal 136 and sent to the central processor 13 via communication lines 138, other orders are being received from other terminals 142 and are coupled through local communication lines 142 to the central processor 13. After the signals are received by central processor 13, they are processed through a comparator 144 which compares all offers to bids and all bids to offers to see if the order can be matched with a corresponding bid or offer and processed or executed. If it cannot be executed, it is coupled through line 146 to a commodity or contract price file 148 where it is stored according to time received, price asked and quantity of the commodity. This information, of course, may be coupled to a display 150 through connection 152 for visual inspection.

If the comparator 144 determines that the order can be matched or executed, it produces an output on connection 154 which is coupled to pending file 156 and stored. If the order can be matched with a corresponding bid or offer, the execution of the trade takes place and the information is coupled through connection 158 to printer 160 for confirmation of the execution. In addition, the output of pending file 156 on line 162 is coupled to printer 162 for printing of the confirmation of the order received. Obviously a common printer may take the place of both printers 160 and 163. Finally, the stored information in pending file 156 may be coupled through connection 161 to display 164 where that information can be viewed by operators of the exchange.

Figure 6:
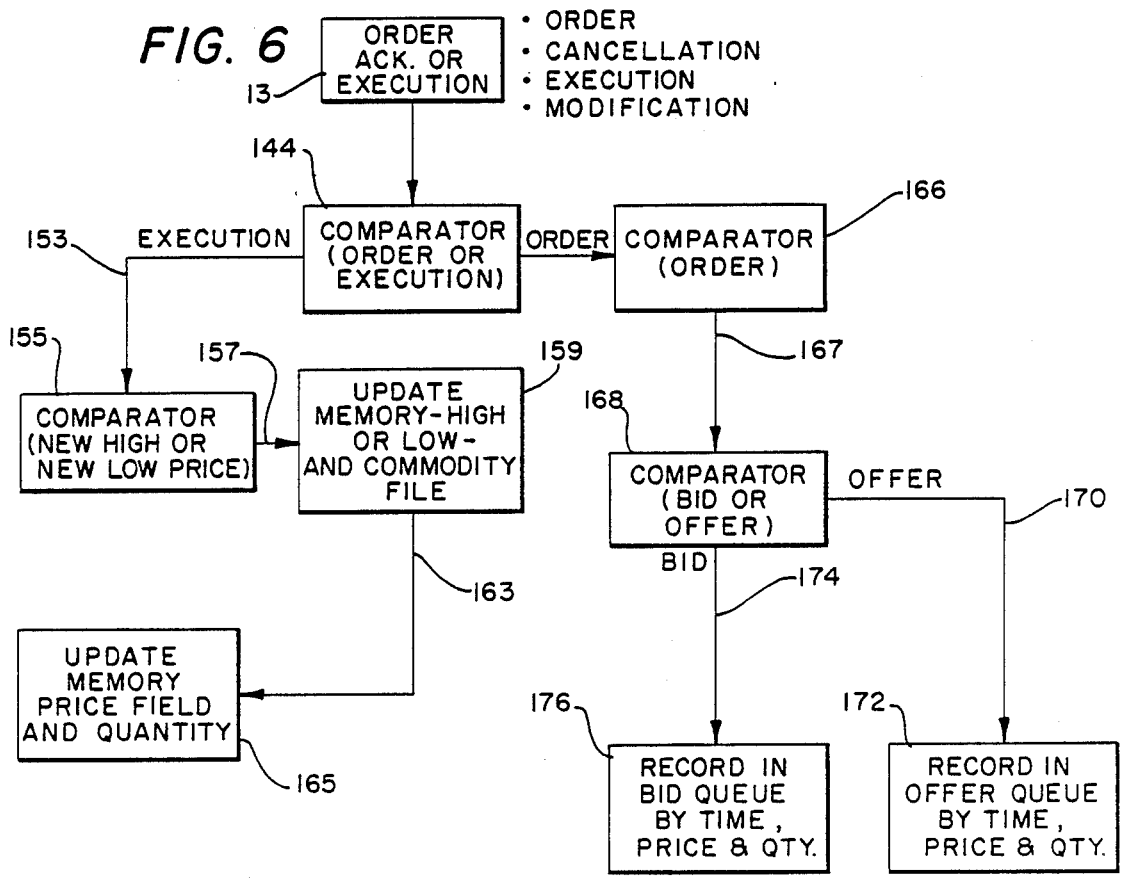
FIG. 6 is a diagrammatic representation of the memory storage circuits of the host or central computer in the trading system for storing the bids or offers by time, price and quantity and for updating the price field in the memory when a new high or new low price is submitted.

Further details of the system of FIG. 5 is shown in FIG. 6. Thus the host or central processor 13 can receive cancellation of orders, modification of orders or orders that can be executed. Again, if comparator 144 finds that a match occurs with a particular order and an execution can occur, a signal is produced on connection 153 which is coupled to comparator 155 which determines whether or not there is a new high or new low price. If a new high or a new low price is determined, that information is coupled through connection 157 to the memory 159 where the commodity file and the day file is updated with the new high or the new low price for that day and for that commodity. That information is also coupled through connection 163 to memory 165 to update the central processor price field and quantity file. In addition, of course, the confirmation of the order and the execution and the display thereof is taking place as shown in FIG. 5.

If comparator 144 determines that the order cannot be executed because it is a particular type of order or because it has been cancelled or modified or does not match a bid or offer, the signal is coupled to comparator 166 which determines the type of contract or commodity to which the order relates and then couples that information on connection 167 to another comparator 168 that determines whether the order is a bid or an offer for that particular type of commodity. If it is an offer, the signals are coupled through connection 170 to memory queue 172 which records the offer in the queue by time, price and quantity.

If comparator 168 determines that the order is a bid, it produces an output on connection 174 which is coupled to memory 176 where the bid information is recorded in the bid queue by time, price, and quantity. Thus, the information is stored for future use when a match can be found. In like manner, if the order is a cancellation or modification of either an offer or a bid then the bid queues and offer queues are modified accordingly.

Figure 7:
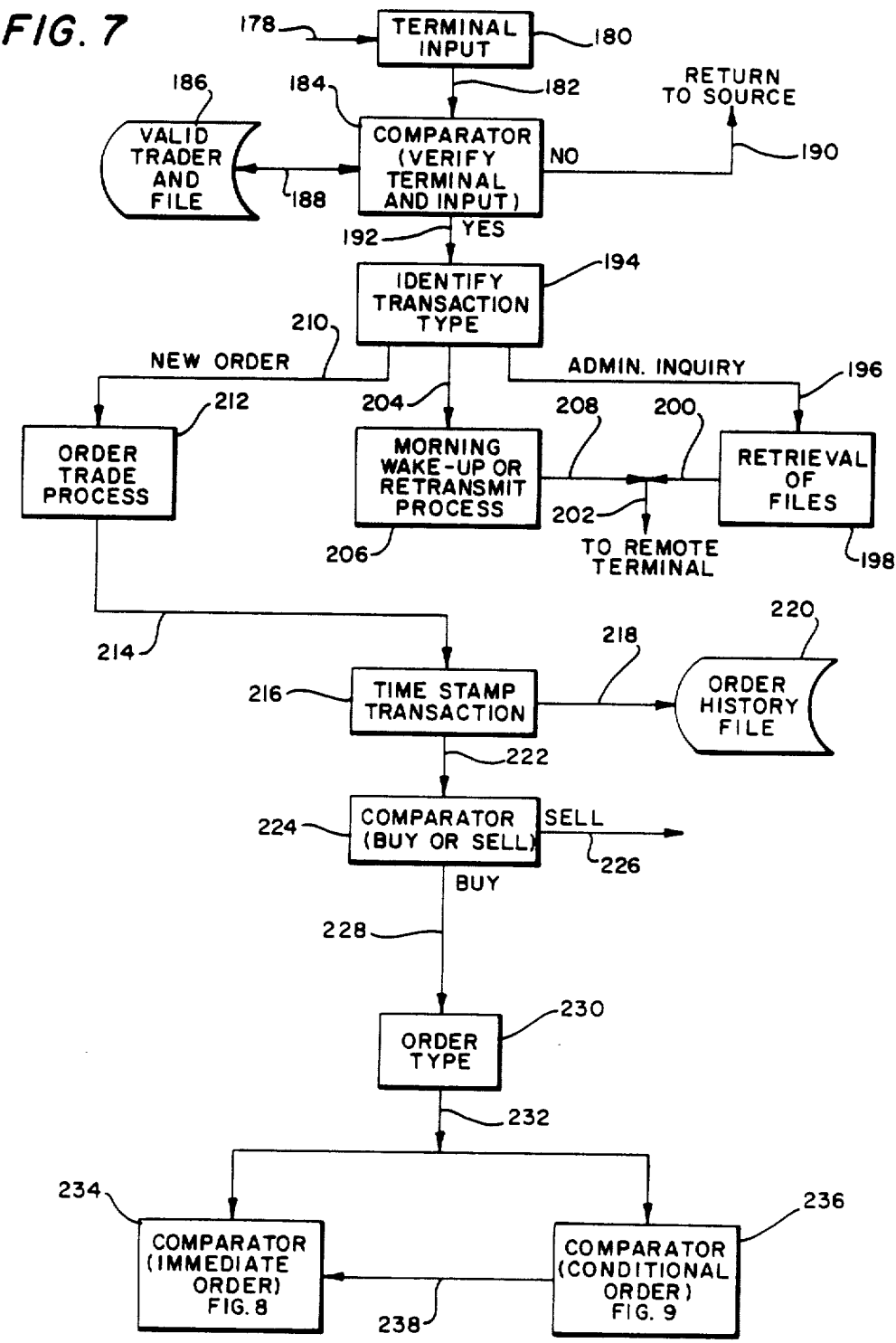
FIG. 7 is a diagrammatic representation of the central computer or host hardware in the trading system which processes the signals received as order signals, administrative inquiries or morning wakeup information or read transmission request for incomplete data.

A more detailed diagrammatic illustration of the central processor 13 and the processing system of the futures trading exchange 10 is set forth in FIG. 7. The input on common communication lines 178 from the remote terminals (18, 20 in FIG. 1) is received by the central processor input terminal 180 which produces an output on line 182 that is coupled to a comparator 184. The comparator looks at memory 186 through connection 188 to compare the signal codes received with a stored trader and contract file code. If the input signal cannot be verified that the terminal and the trader are valid, a signal is produced on line 190 which is sent back to the remote terminal indicating that the input signal is not acceptable. If the comparator 184 determines that the input signal is valid then it produces an output on line 192 which is coupled to transaction identifier 194. This unit 194 determines whether the transaction is a new order, an administrative inquiry, or a morning wakeup or retransmit process.

If an administrative inquiry is received from a remote terminal, a signal is produced on line 196 which is coupled to memory 198 for retrieving the information in the files about which the inquiry is made. An output is then produced on line 200 which is retransmitted through common communication lines 202 to the remote terminal requesting the information.

If morning wakeup information is required or a retransmission of data is required, the output of identifier unit 194 on line 204 is coupled to the memory 206 to obtain the information for the morning wakeup and the output on line 208 is again transmitted through local communication lines 202 to the remote terminal requesting the morning wakeup.

If identifier unit 194 determines that the incoming signals constitute a new order, it produces an output on connection 210 to the order process circuitry 212 in the central processor unit for processing. The output of circuitry 212 on line 214 is coupled to a time stamp unit 216 and sent through connection 218 to the memory history file 220. Thus, a file history of all orders is kept in memory 220.

As the order is time stamped and filed in the history file of memory 220, it is also coupled through connection 222 to decision unit 224 which decides whether the order is a buy or sell order. The processing of the buy and sell orders are exactly the same and so only a discussion of the buy order processing will be disclosed in detail. The signals which are produced by decision unit 224 on line 226 and coupled to the sell processing network will be the same as that which is discussed for the buy processing network except that separate storage queues would be used. The output of decision unit 224 on 228 occurs if the order is a buy order and is coupled through decision unit 230 which determines whether or not the order is an immediate order or a conditional order. The output of decision unit 230 on line 232 is coupled to circuit 234 if it is an immediate order or is coupled to circuit 236 for processing if it is a conditional order. If the conditional orders considered by circuit 236 meet all of the required conditions, then a signal is produced on line 238 which is coupled to the immediate order circuit 234 for processing.

Figure 8:
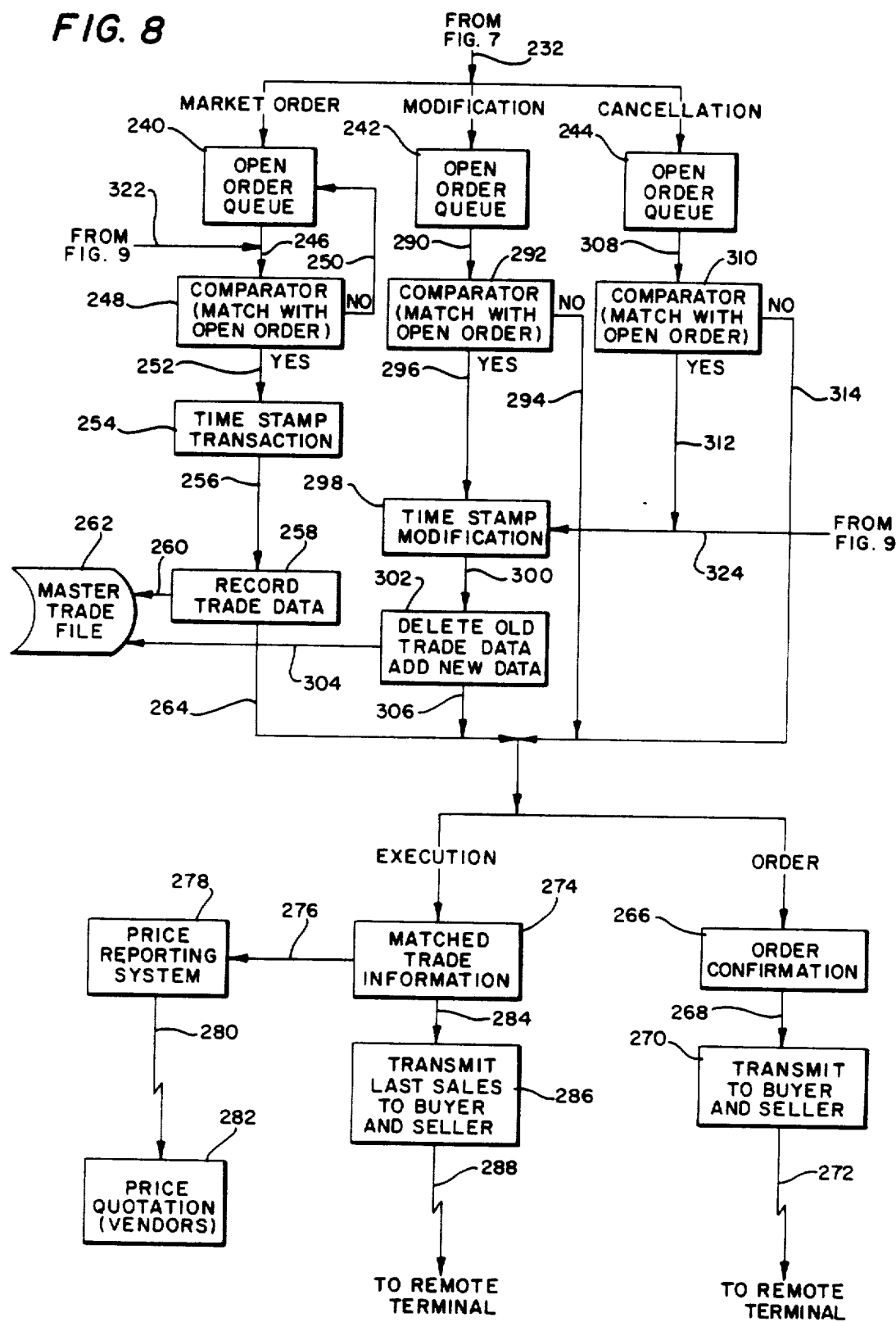
FIG. 8 is a diagrammatic representation of the host or central computer hardware in the trading system illustrating how an immediate order is processed by the central computer.

The immediate order processing circuit 234 in FIG. 7 is shown in detail in FIG. 8. The output of decision unit 230 on line 232 is coupled to open order memory queue 240 if it is a market order, to open order memory queue 242 if it is an order modification request and to open order memory queue 244 if the input is an order cancellation. These memory queues store the signals on a first come, first served basis.

If the input signal on line 232 is a market order, it is placed in open order queue 240 which produces an output on line 246 which is coupled to a detector 248 which checks to see if the order would match with a corresponding existing open order. If no match occurs, the output signal on line 250 is coupled back to the open order queue 240 to maintain the market order so that the order can be continually sent to detector unit 248 until a match is found. If a match is found, the detector unit 248 produces an output on line 252 which is coupled to timing unit 254 where the order is time stamped at the time the transaction takes place. The signal is then coupled on line 256 to memory 258 where the transaction is recorded and transferred via line 260 to master trade file 262. Also, the output of memory 258 on line 264 is coupled to a confirmation circuit and an execution circuit. The order is confirmed in confirmation circuit 266 which produces an output on line 268 that is coupled to a terminal 270 where the confirmation is broadcast to the buyers and sellers at the remote terminals on common communication lines 272.

At the same time, the signal is also coupled to execution circuit 274 which determines that there is a matched trade and stores that information. The information is also coupled on line 276 to a price reporting system 278 which transmits the signal on common transmission lines 280 to vendors 282 who desire the price quotations. At the same time, the circuit 274 produces an output on line 284 to terminal 286 to broadcast the last sale to buyers and sellers over communication lines 288 to remote terminals.

If the order received on line 232 from decision unit 230 in FIG. 7 is a modification order, it is coupled to open order queue 242 which produces an output on line 290 to match determining unit 292. If no match can be found for the modified order, an output signal is produced on line 294 which is coupled to order confirmation unit 266 and sent back to the remote terminals as a confirmed received order as indicated previously.

If a match can be obtained, unit 292 produces an output on line 296 that is coupled to time unit 298 which time stamps the modified order and sends the signals on line 300 to a memory 302 which deletes the old trade information stored in master file 262 and adds the new data via line 304. At the same time, it produces an output on line 306 which is coupled to the execution matching trade unit 274 for processing as indicated previously.

If the signals received from the decision unit 230 on lines 232 in FIG. 7 are cancellation order signals they are sent to open order queue 244 which produces an output on line 308 to matching unit 310. If a match has already occurred indicating that the bid or offer has been accepted and cannot be cancelled, a signal is produced on line 312 which is coupled to the time stamp unit 298 and is processed as described previously. If no match occurs, indicating that the order is open and outstanding and can be cancelled, a signal is produced on line 314 which is coupled to the execution circuit 274 for execution and the order confirmation circuit 266 both of which are transmitted to the remote terminals as described previously.

Figure 9:
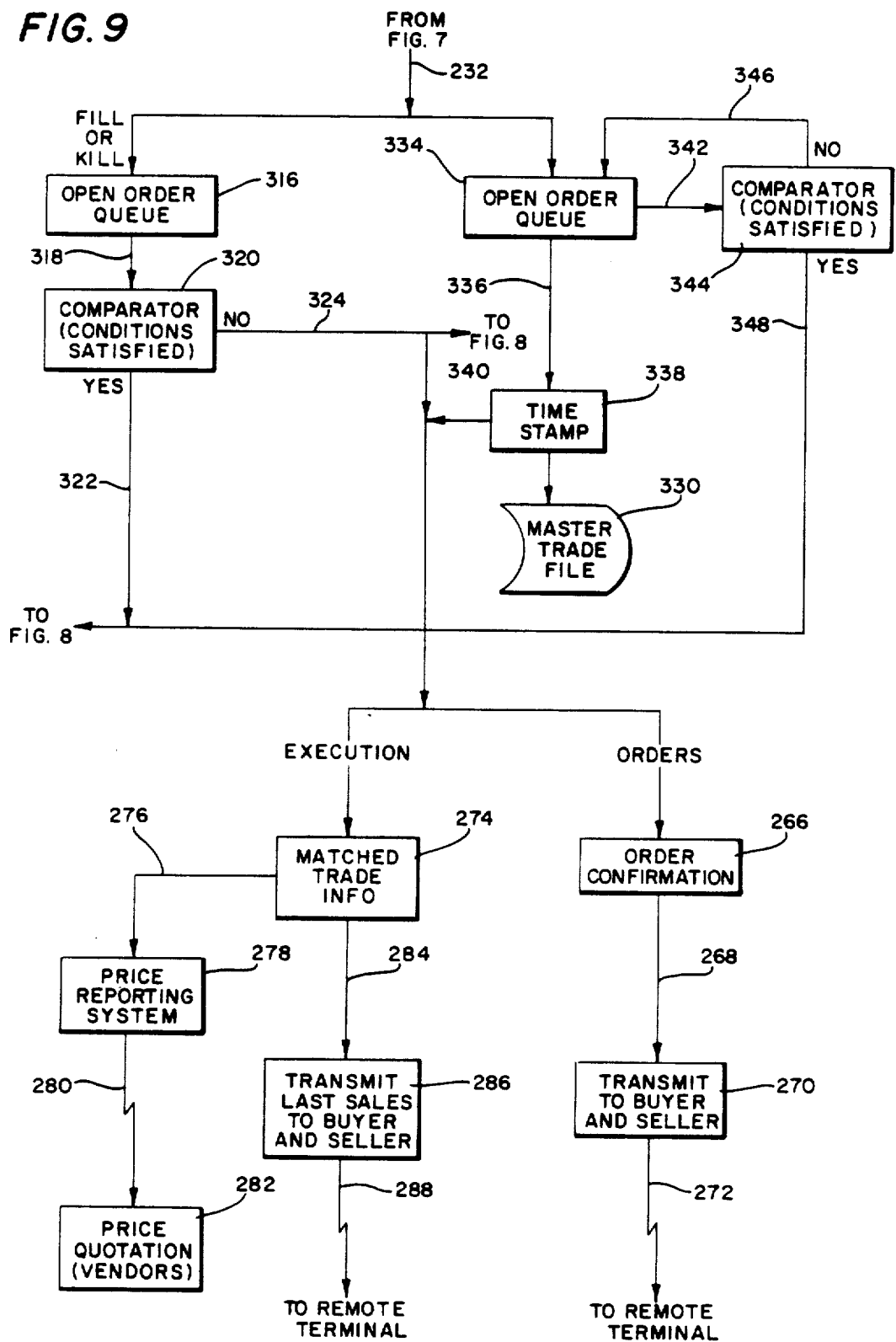
FIG. 9 is a diagrammatic representation of the host or central computer hardware in the trading system illustrating how a conditional order is processed.

The conditional order circuit 236 in FIG. 7 is disclosed in detail in FIG. 9. If the signal produced by decision unit 230 on line 232 in FIG. 7 is a conditional order it will be coupled on line 232 to the conditional order circuit shown in FIG. 9. The conditional orders are either "fill or kill" or "limit up," "limit down," "time order," "at market", "stops," and "spreads/straddles." Other types could be established if needed or desired. If the conditional order is a "fill or kill" order it is coupled to open order memory queue 316 where it is stored and an output produced on line 318 to circuit 320 which determines whether or not the "fill or kill" conditions can be satisfied. If the order can be filled, circuit 320 produces an output on line 322 which is coupled to match circuit 248 in FIG. 8 and the signal processed as described previously. If the condition cannot be satisfied, then the order is killed by an output being produced on line 324 which is coupled to time stamp unit 298 in FIG. 8 which produces an output on line 300 to the delete data circuit 302 for executing the cancellation in Master Trade File 262 as explained earlier and to confirmation circuit 266 where the signals are processed as described previously in relation to FIG. 8 and confirmed to the remote terminal.

If the signal on line 232 from FIG. 7 is a conditional order other than a "fill or kill" order it is coupled to open order queue 334. That memory produces an output on line 336 which is time stamped at unit 338 and stored in master trade file 330. In addition, that information is coupled from time stamp unit 338 on line 340 to the matched trade information circuit 274 and order confirmation circuit 266 for processing as described earlier with relation to FIG. 8. Open order queue 334 also produces an output on line 342 to decision unit 344 to see if the conditions are satisfied. If they are not, they are returned through line 346 to open order queue 334 for reprocessing in an attempt to satisfy the condition. If and when the condition is satisfied, the output of circuit 344 on line 348 is coupled to the match decision circuit 248 in FIG. 8 for processing as described previously.

Figure 10:
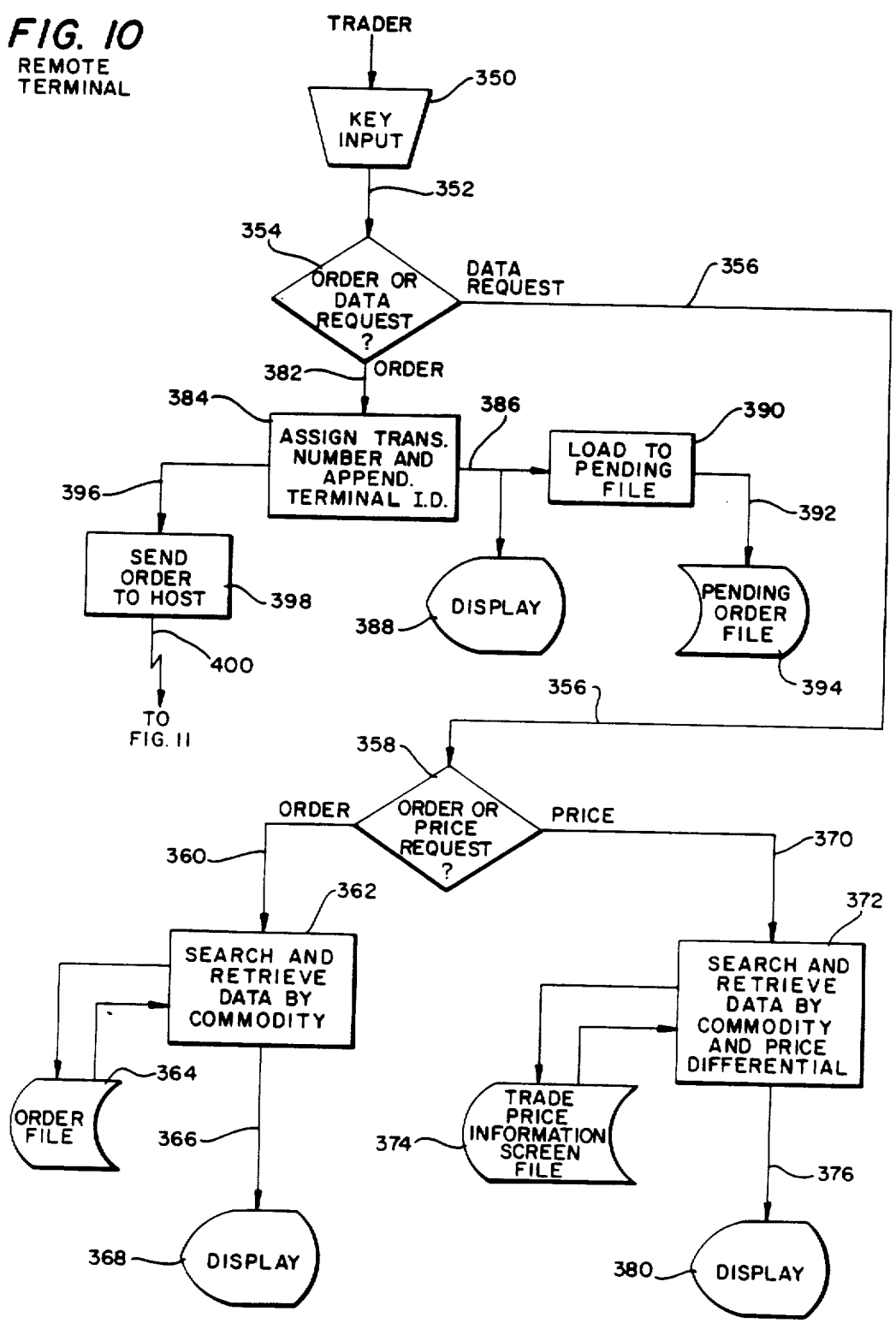
FIG. 10 is a flow chart of the trading system illustrating the overall order flow of the remote terminal.

The flow chart for the remote terminal or trader system is shown in FIG. 10. A trader at the remote terminal site, enters data into the system through a keyboard input 350 which produces data signals on line 352 indicating either an order or data request. The decision unit 354, whether the signal is an order or a data request, couples those signals through line 356 to a decision circuit 358 to decide whether the data requested is order data or price data. If it is order data, the signal is coupled on line 360 to a unit 362 which stores the order as a pending order by contract or commodity, price and quantity. This information is stored in memory 364 and can be coupled to line 366 for display by display unit 368. In like manner, if the requested data is price data, decision circuit 358 produces an output signal on line 370 which again is coupled to a circuit 372 which searches for and retrieves data from the memory by contract (commodity) and price. This information is obtained from memory 374 and can be coupled through line 376 to display 380 for display for the operator.

The data entered by the trader through keyboard 350 as order data or a data request to the control processor of the futures exchange is coupled through line 382 to a circuit 384 which assigns a transmission number and appends the appropriate terminal identification number. The circuit 384 also produces an output on line 386 which couples order data to display 388 and to a circuit 390 which loads that information on line 392 to memory 394 for storage purposes as a pending order.

After circuit 384 assigns the transaction number and appends the terminal I.D. number to the data, the data then is coupled through connection 396 to modem 398 for transmission on common transmission lines 400 to the central processor of the futures trading exchange.

Figure 11:
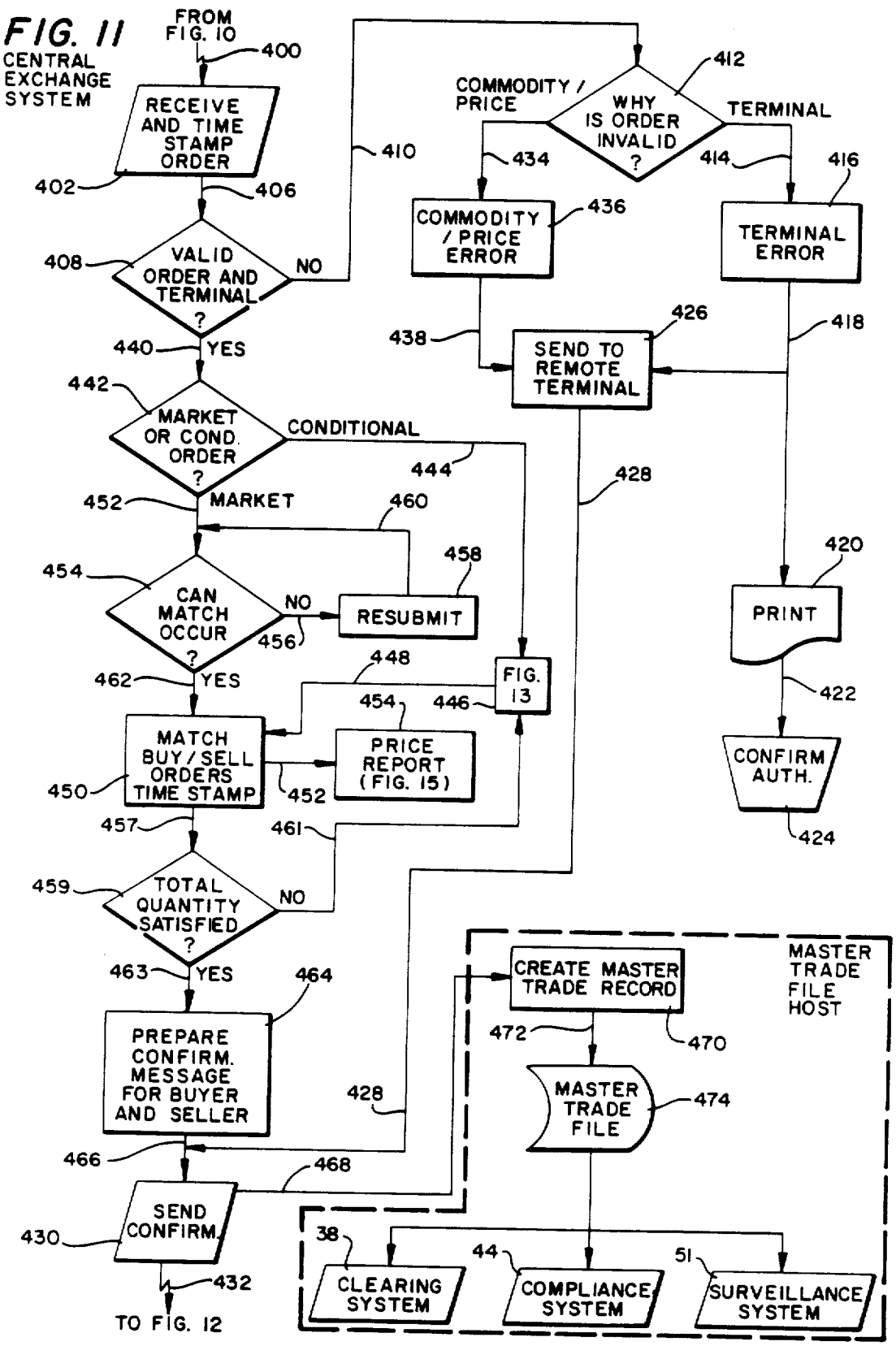
FIG. 11 is a partial flow chart of the trading system central processor illustrating the data flow required to process the received bids and offers.

FIG. 11 is a flow chart diagram of the exchange system wherein the central processor 12 receives the incoming orders or data requests, processes them and retransmits the pertinent information to the remote terminals for storage. The exchange system receives the order information from the remote terminal on line 400 and where it is received and stamped according to the time received as at step 402. The signal is then coupled on line 406 to a decision circuit as at step 408 which determines whether or not the order is valid and whether the terminal is valid. This step simply compares the codes received from the remote terminals with the codes stored in the central processor and if it determines that the received signals are not valid an output is coupled on line 410 to decision step 412 which decides whether the terminal is invalid or the contract or price is invalid or both and, if the terminal identification is invalid, it produces an output signal on line 414 which is coupled to step 416 which formats a message indicating that the terminal identification number is not authorized and is rejected. This information is not only coupled on line 418 where it can be printed as at step 420. It is also coupled through line 422 to a storage unit as at step 424 for storage in the master file. The rejection signal on line 418 is also coupled to a circuit as at step 426 which sends the message signal indicating that the terminal is unauthorized on line 428 to a modem unit as at step 430 which produces an output on line 432 that is the common communication line to the remote terminal.

If it is the contract (commodity), price or quantity that is determined to be invalid, the signal is produced by a decision unit as at step 412 on line 434 to a circuit which formats a message as at step 46 indicating that the contract or price range is invalid and a rejection signal is produced on line 438 which again is coupled to a circuit to produce an output as at step 426 on line 428 which is transmitted to the remote terminal as stated previously.

If the signal received from the remote terminal is valid, an output signal is produced as at step 408 on line 440 which is coupled to a decision unit which determines the signal to be either a conditional signal or a market signal as at step 442. If the signal is a conditional signal, it is coupled through line 444 to an order queue circuit for processing as at step 446 as will be described later in relation to FIG. 13. If the signal can be processed, an order queue produces an output as at step 446 on line 448 which is coupled to a match circuit. In that circuit as at step 450, the buys are matched with offers and sells are matched with buys and those orders are time stamped.

If the decision circuit determines that the order is a market order as at step 442, then it produces an output signal on line 452 which is coupled to a match determination circuit. If no match can be found as at step 454, a signal is produced on line 456 which is coupled to resubmit circuit which transmits the signal as at step 458 on line 460 back to the input of the match circuit which continues trying to match the order with a corresponding buy or sell as at step 454. When a match is obtained, an output signal is produced on line 462 which is coupled to circuit where the buy is matched with a sell or the sell with the buy and the transaction is time stamped as at step 450.

Figure 15:
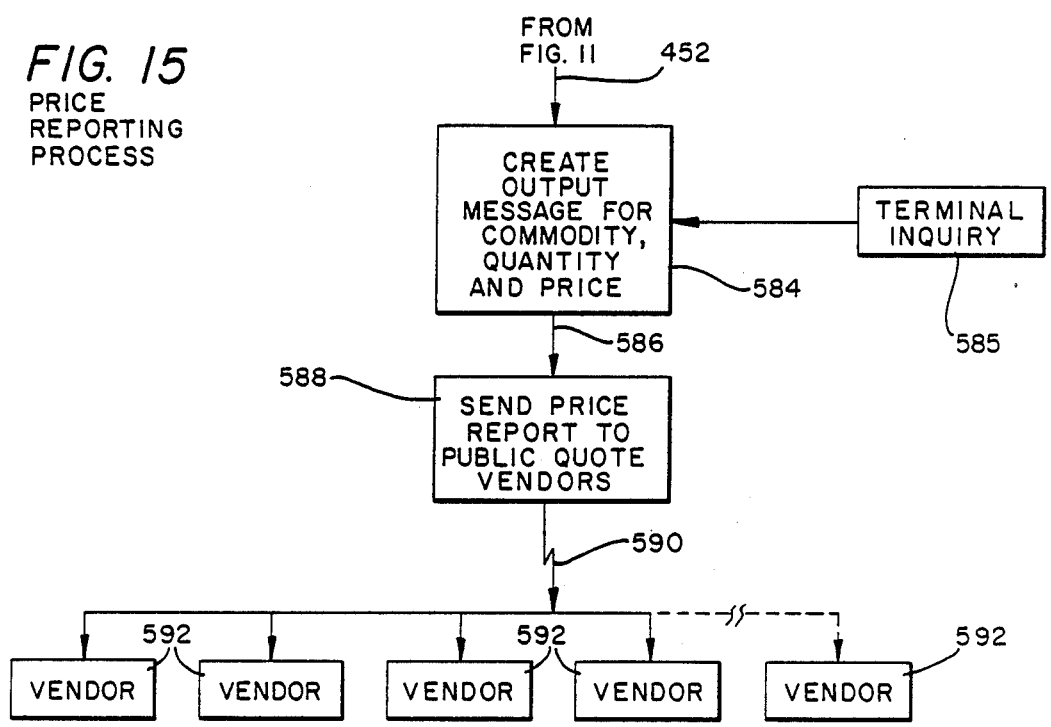
FIG. 15 is a flow chart representing the public pricing reporting process of the host or central computer in the trading system.

The output of the time stamp circuit at step 450 is coupled first on line 452 to price reporting system which is shown in detail in FIG. 15 and which is a public price reporting process as at step 454 to enable the public to see the price of the transactions that are occurring.

The output of the time stamp unit at step 450 is also coupled on line 456 to decision unit which determines whether or not the total quantity of the order can be satisfied as at step 458. If only part of the order can be satisfied and there is a partial match, that portion which is not matched is coupled through path 460 back to the order queue where it is reprocessed as in step 446 until a match can occur.

If a match can occur for the received order, the output of step 458 on line 462 is coupled to a unit which prepares the confirmation message to be sent to the buyer and seller at the remote terminals as at step 464. This output is coupled on line 466 to a modem which transmits the signal on line 432 back to the remote terminals as at step 430.

In addition, the modem unit produces an output signal at step 430 on line 468 which is coupled to a master trade file in the central processor which creates a master trade record including one record for the buyer and one for the seller as at step 470. This record enables an output on line 472 to be stored in the master file index as at step 474 which can be accessed by the clearing system as at step 38, the compliance system as at step 44, and surveillance system as at step 51. These systems are used as has been described earlier with reference to FIGS. 1 through 9.

Figure 12:
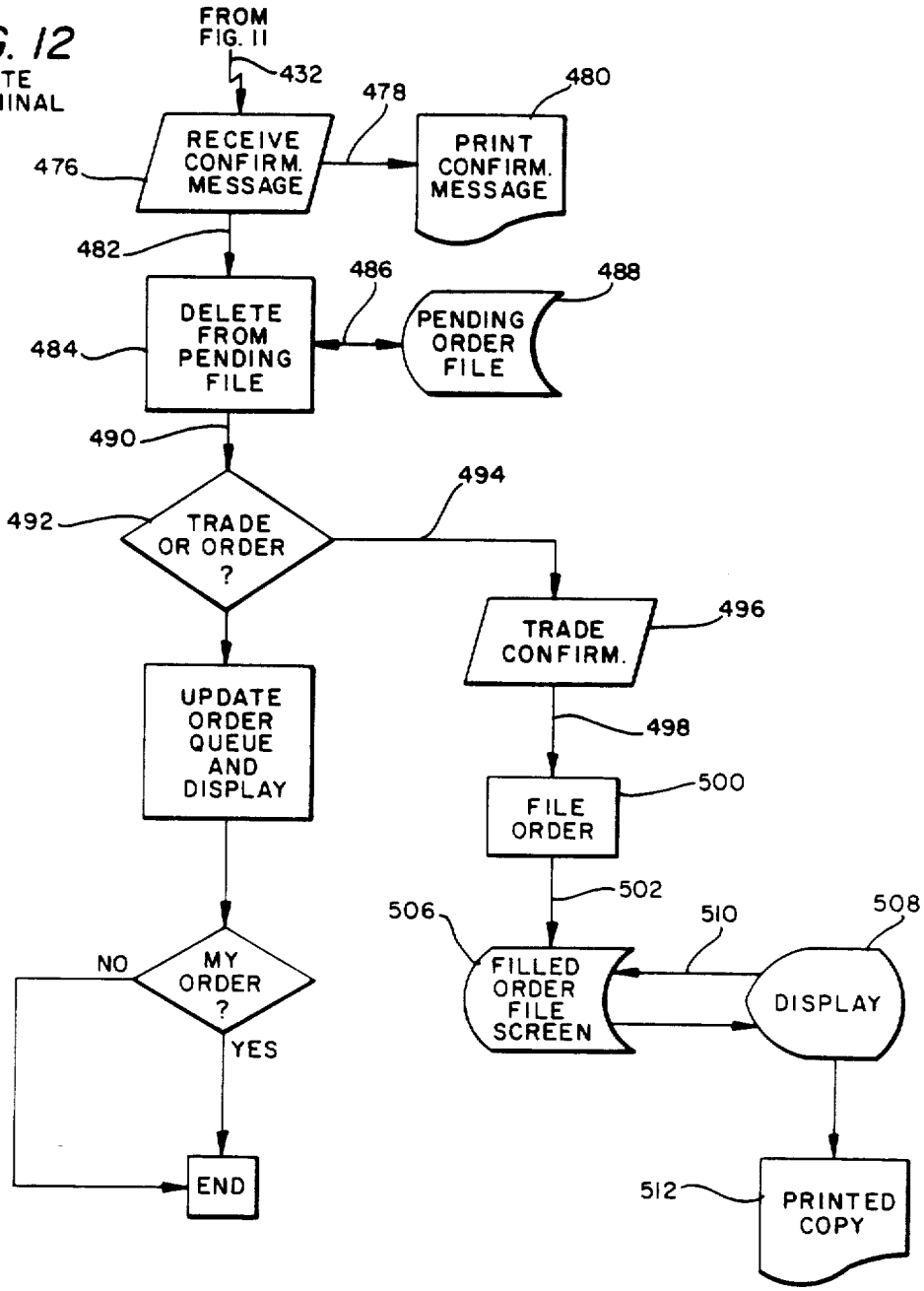
FIG. 12 is a flow chart illustrating how the remote terminal or traders system receives the execution information from the central or host computer in the trading system.
Figure 13:
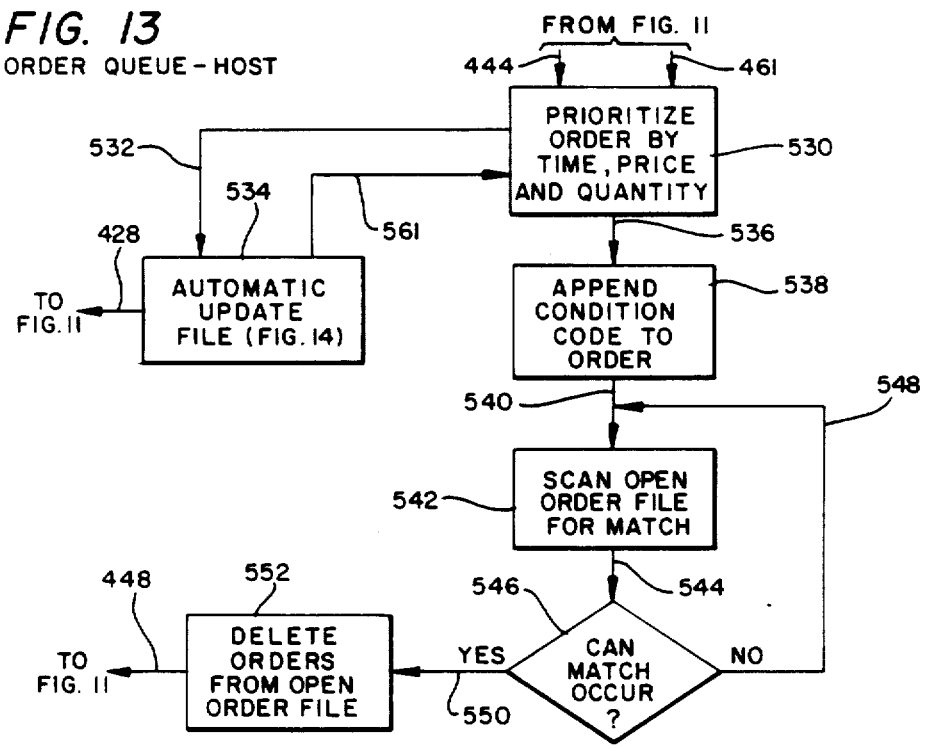
Figure 14:
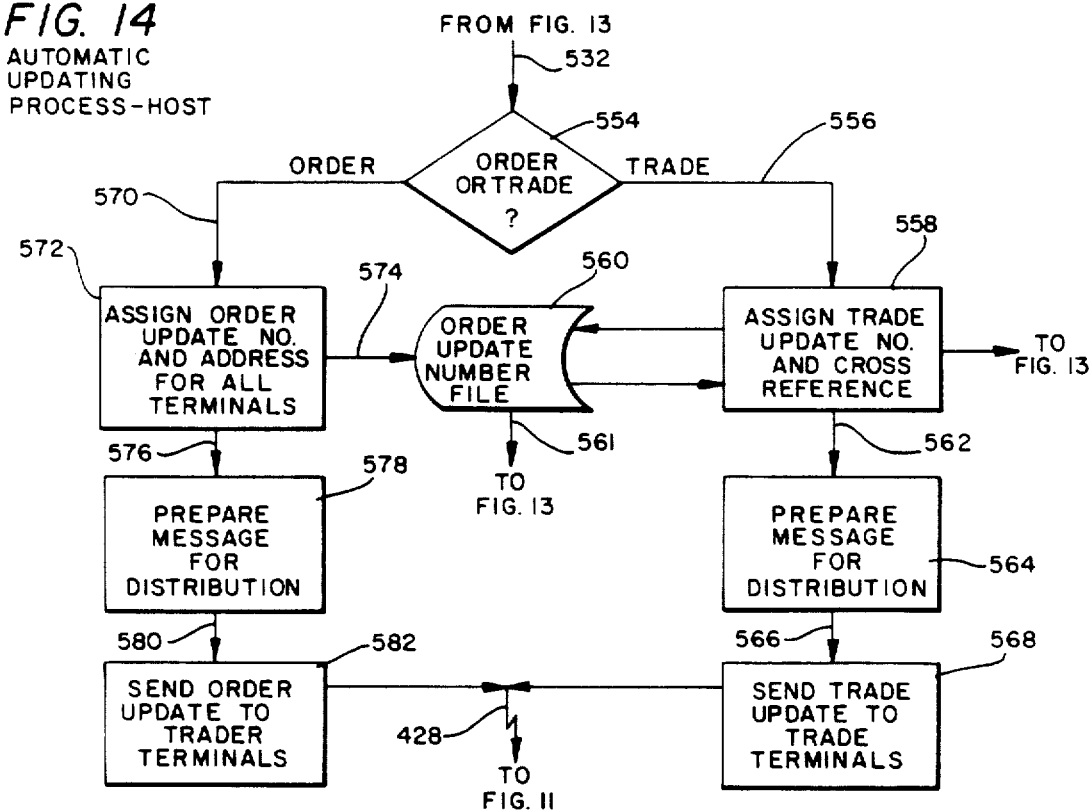
Figure 15:
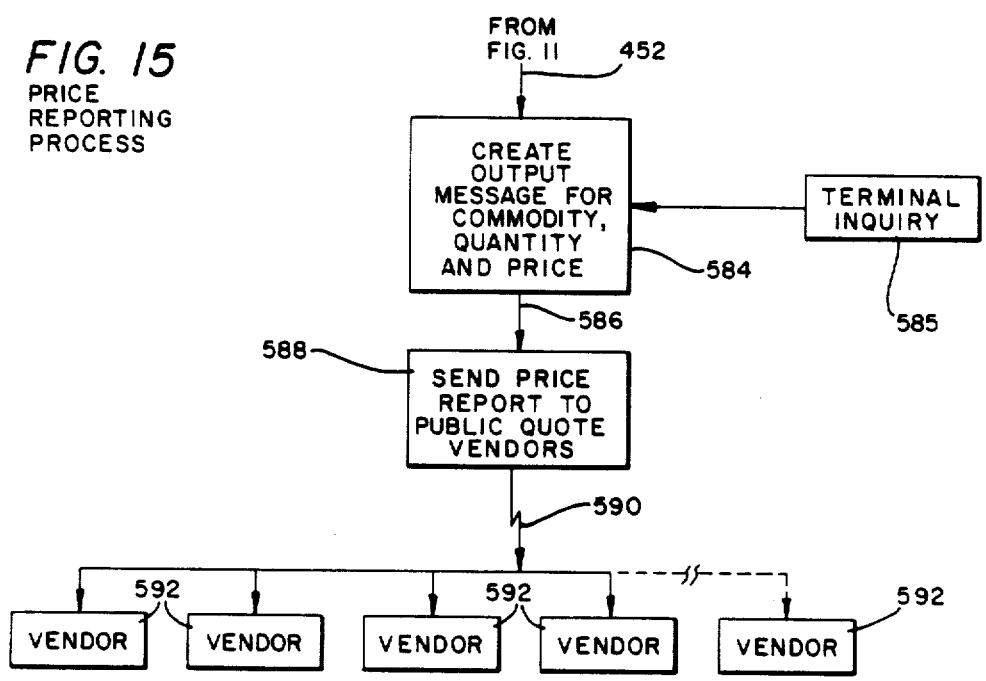
Figure 16:
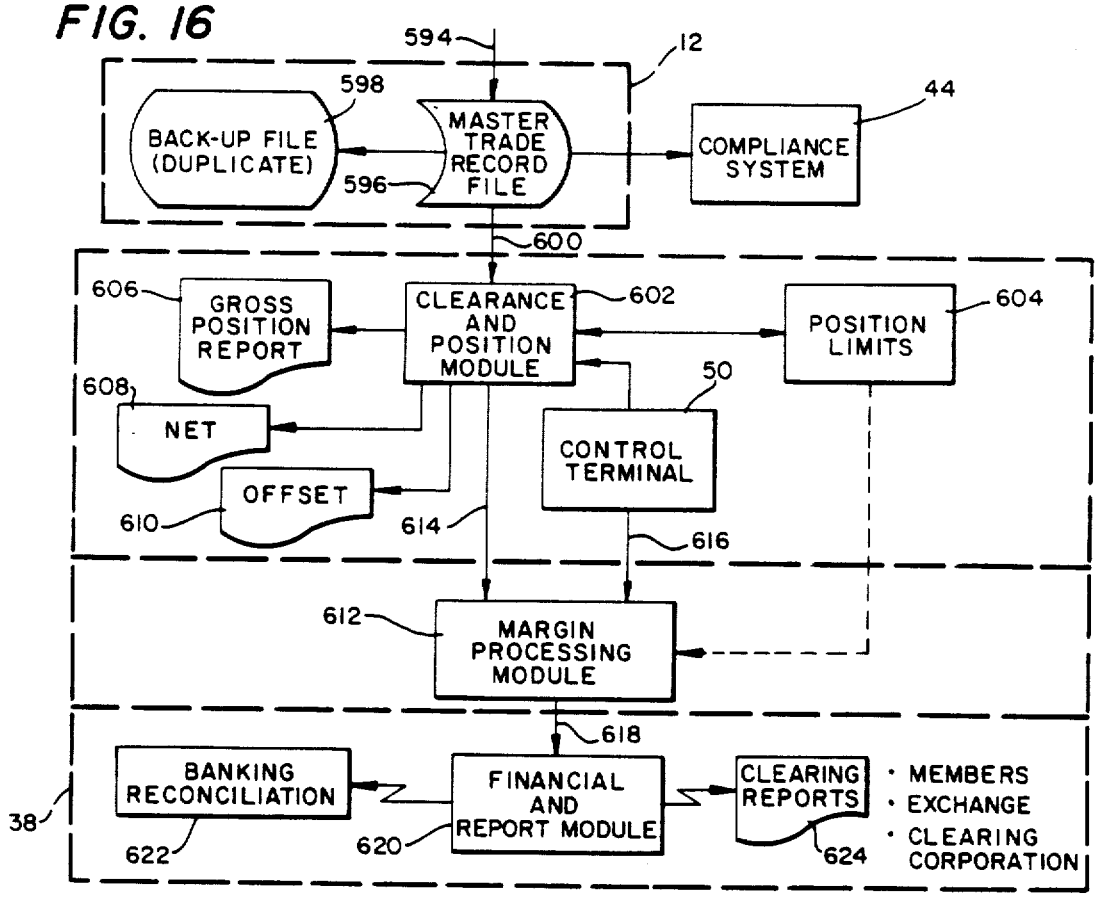
Figure 17:
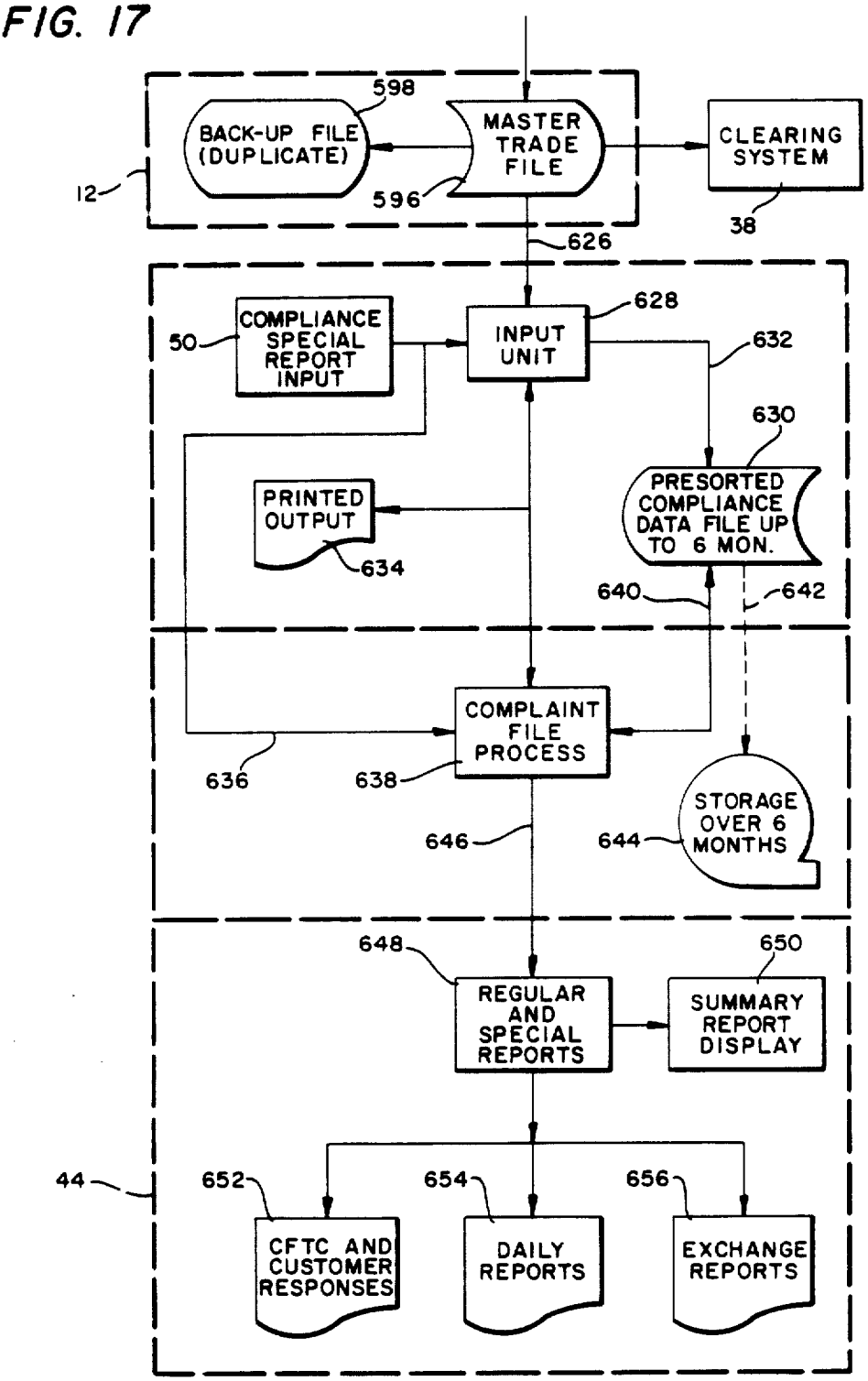
Figure 19:
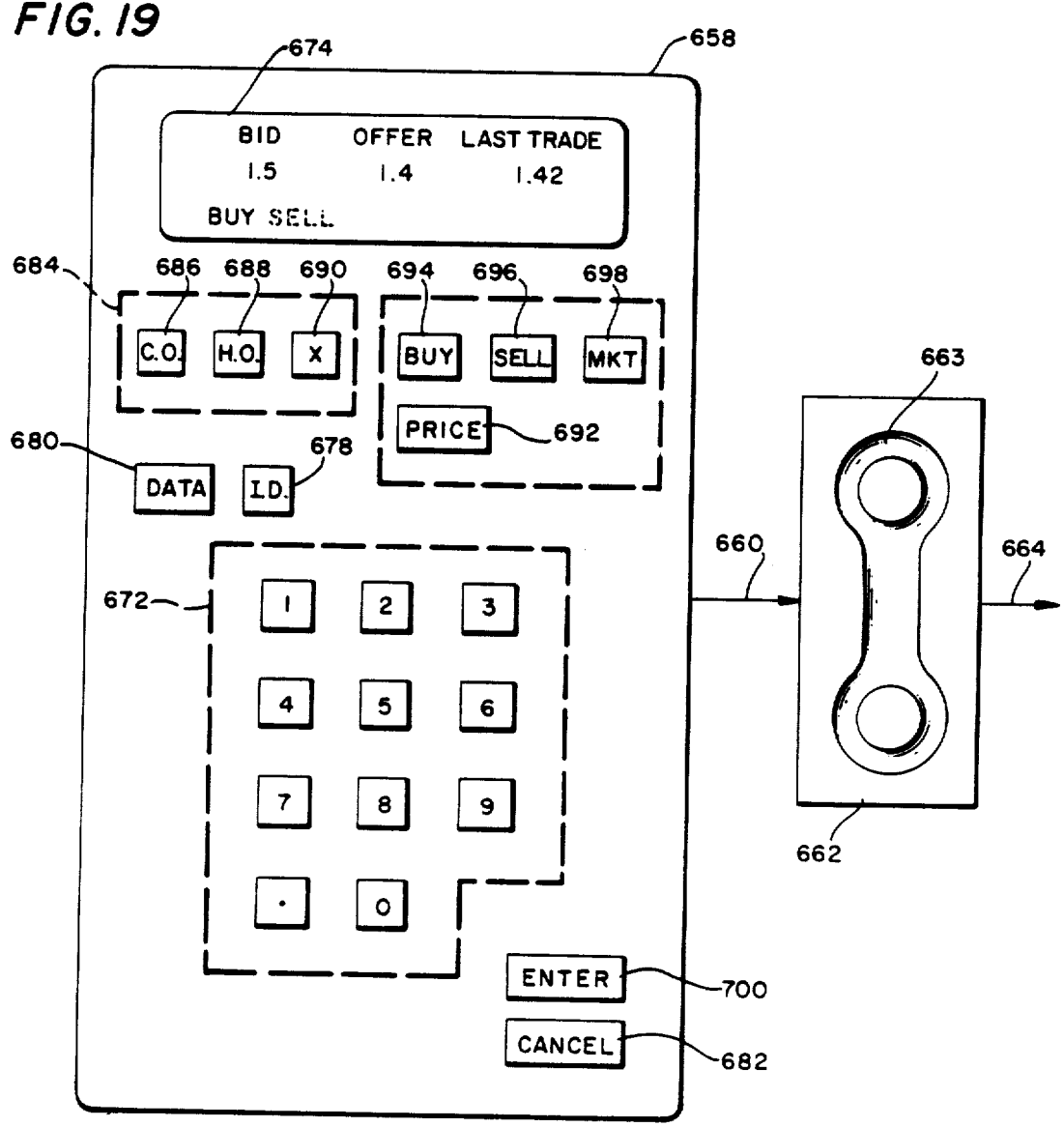
Figure 18:
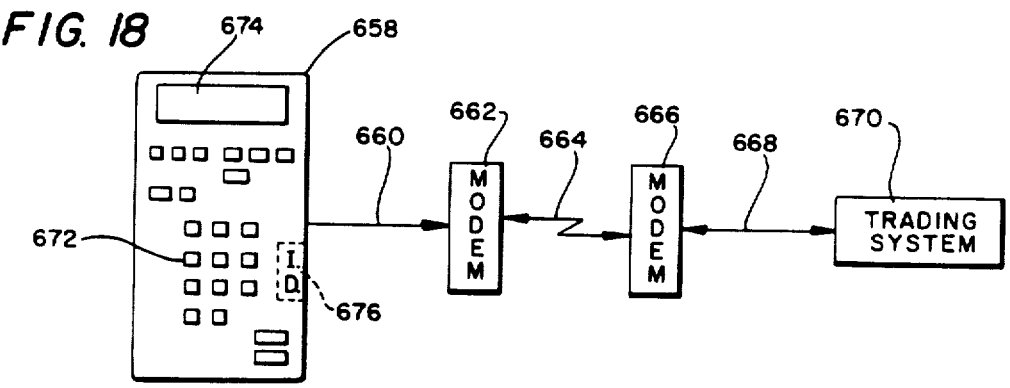

FIG. 12 is a flow chart of the processing of the information transmitted from the exchange system central processor 12 back to the remote terminal 18 or 20. The data from the central processor 12 is coupled on line 432 to the confirmation circuit as at step 476 in the remote terminal 18 or 20. That information is coupled through connection 478 to the printer which produces a hard copy of the confirmation message as at step 480. The output of the confirmation circuit at step 476 is also coupled through connection 482 to the pending file control circuit as at step 484 which produces an output on connection 486 to delete the pending order stored in memory as at step 488 if the order has been filled. Thus, as an order is matched and confirmed, it is deleted from the remote terminal pending order file at step 488.

The pending file control circuitry also produces an output on line 490 which is coupled to decision network to determine whether an order or a trade has been completed as at step 492. If the trade has been completed, the decision network at step 492 produces an output on line 494 which is coupled to a trade confirmation circuit at step 496 that produces an output on line 498 to cause a control circuit to produce an output at step 500 on connection 502 which stores the completed order in memory as at step 506. The display at step 508 is coupled to the memory at step 506 through connection 510 and the filled order can be displayed for visual observance. Also, a printed copy of the order can be produced by the printer at step 512.

Figure 13:
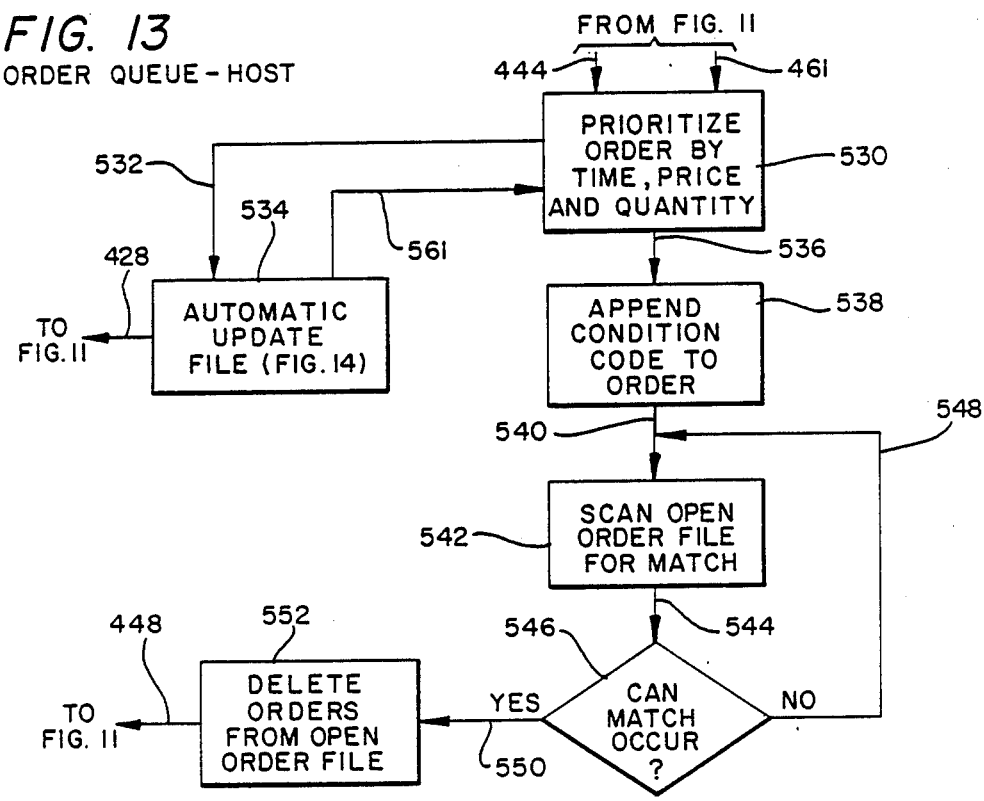
FIG. 13 is a flow chart diagram of the manner in which the orders are queued in the host or central computer in the trading system.

FIG. 13 is a flow chart diagram of the order queue shown as step 446 in FIG. 11. If the decision network at step 442 in FIG. 11 decides that the incoming order is a conditional order, it couples a signal on line 444 to be prioritized by time, price and quantity as indicated at step 530. The output at step 530 is coupled on line 532 for automatic updating and filing as at step 534 which is disclosed in detail in FIG. 14. Step 530 also produces an output on line 536 to a code unit which appends the condition code to the order as at step 538. Thus, a code exists for price limit condition, for the time condition, or the stop condition. Whichever condition is attached to that particular order, it is coded in this step 538 and the output is produced on line 540 to a network which scans the open order file in the central computer to see if a match can occur for those particular conditions as at step 542. Sellers look to the stored bids and buyers look to the stored offers. That output on line 544 is coupled to decision unit to see if a match can occur as at step 546. If no match can be made under those particular conditions, the request is sent back on line 548 to the input of the open order file to continue to scan the open files looking for a match as at step 542. If a match can occur, an output is produced on line 550 to a control unit which deletes the order from the open order file as at step 552 and produces the output on line 448 to a match circuit as at step 450 shown in FIG. 11 where the order is time stamped.

As will be recalled with relation to FIG. 11, if only a part of an order can be satisfied, the part of the order which could not be matched is coupled on line 460 to the prioritizing circuit as at step 530 in FIG. 13 and the signal is processed as described previously in relation to a conditional order.

An automatic update file at step 534 receives the data on line 532 from the prioritizing network at step 530 and updates the files automatically to keep track of the conditional orders. The automatic update file process at step 534 produces an output on line 428 which is coupled to the input of a send confirmation circuit at step 430 in FIG. 11 from where the information is sent back to the remote terminal for storage.

Figure 14:
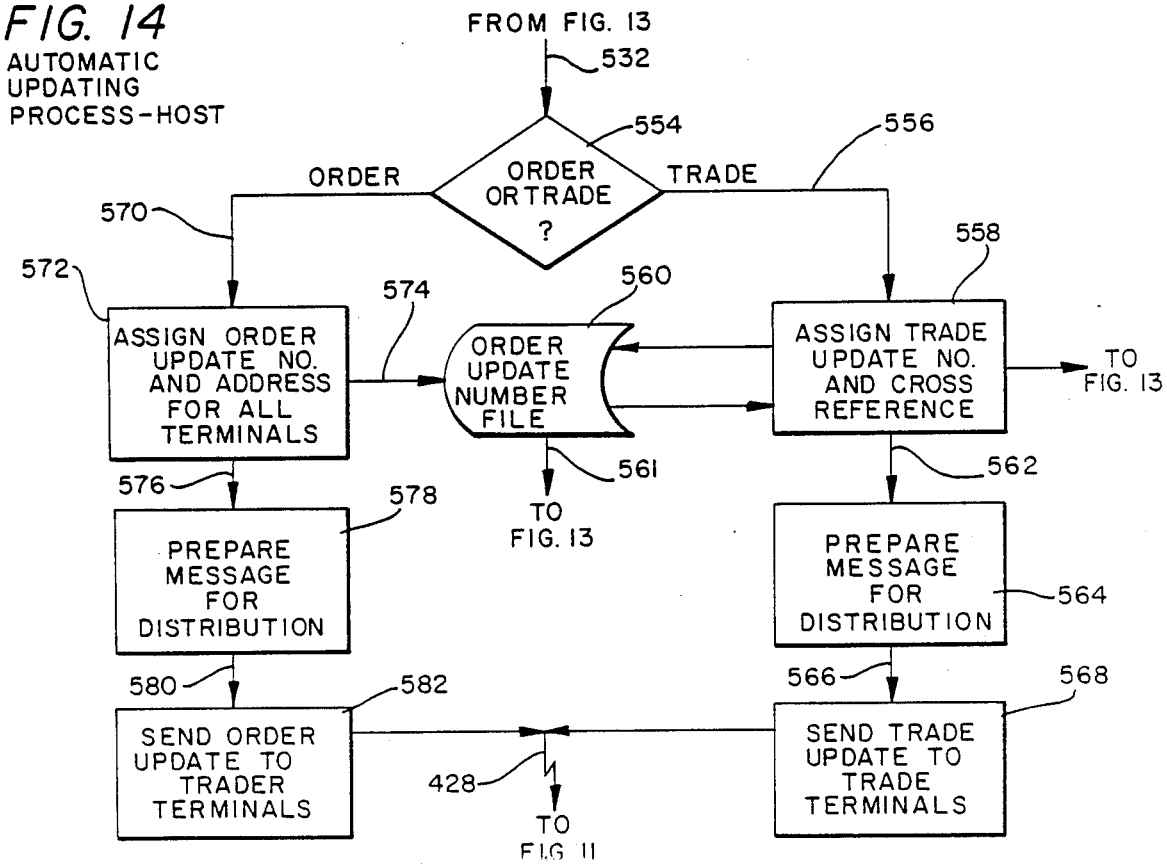
FIG. 14 is a flow chart illustrating the automated updating process of the host or central computer in the trading system.

The details of the process of automatic updating the files at step 534 are shown in the flow chart set forth in FIG. 14. The information is received from the prioritizing network as step 530 on line 532 and is coupled to a decision network as at step 554 in FIG. 14. If the signals are representing a trade, they are coupled on connection 556 to control circuit which stores that information at step 558 in computer memory at step 560. A signal is also produced on line 562 to a unit at step 564 which prepares a message for distribution to the remote terminals. This output message on line 566 is coupled to transmitting unit at step 568 for transmission on line 428 to the remote terminals.

If the message received is for an order, a decision unit produces an output at step 554 on line 570 which is coupled to an assignment order update control unit that produces an output at step 572 on line 574 and stores the data in the order update file at step 560. The assignment order update unit at step 572 also produces an output on line 576 to a message preparation unit at step 578 that prepares the message and couples it on line 580 to a transmitting unit at step 582 which produces an output on line 428 to the remote terminals.

The public pricing reporting process at step 454 in FIG. 11 is disclosed in detail in FIG. 15. The signal on line 452 from a match circuit at step 450 in FIG. 11 is coupled in FIG. 15 to message creating unit at step 584 which creates the output message for the contract, the quantity and the price. That message is coupled on line 586 to a transmitting unit at step 588 which sends the price report to the public quote vendors on commercial communication lines 590 to various users represented at step 592.

Figure 16:
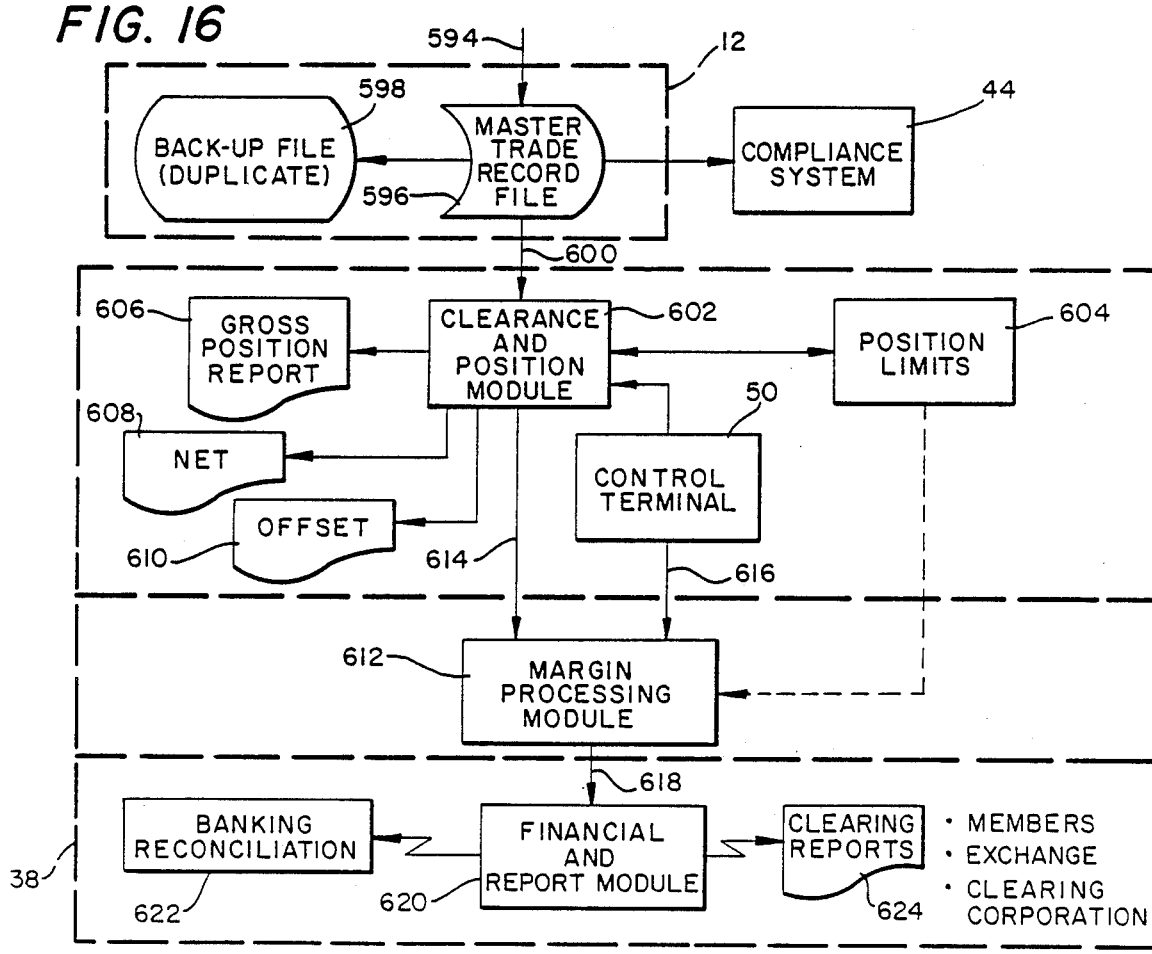
FIG. 16 is a detailed diagrammatic representation of the clearing system as well as its association with the trading system and the compliance system.

FIG. 16 is a detailed diagrammatic representation of the clearing system 38 as well as its association with the trading system 12 and the compliance system 44. Thus, trading system 12 collects all trade activity and input data on line 594 and forwards it to the master trade record file 596. The master trade file also transfers information to backup file 598 for redundant purposes. Thus, the master file 596 contains all trade related data which supports both the clearing system 38 and the compliance system 44. Master file 596 serves as an audit tool so that all buy and sell transactions are maintained in the record for review at a later date.

Clearing system 38 establishes Commodity Futures Trading Commission (CFTC) requirements and regulations to be observed during the trading process. It determines the validity of each transaction by comparing the transaction data with the CFTC requirements and regulations. The clearing system 38 receives data from the master trade file 596 on line 600 and sorts the data by clearing member and trade type (house/customer). Further, the clearance and position module 602 calculates the gross position report for the CFTC. This means that it keeps track of all trades of any member in total. It compares trades with position limits established at position limit unit 604 to see that the trader is staying within limits which are set by the exchange through control terminal 50 on lines 606. Thus, the exchange enters through control terminal 50 (a keyboard, for example) the data necessary to establish position limits for each customer and stores those in clearance and position module 602. The gross position report of any particular trader can be made into a printout at 606 so that a written copy of the position of each member can be obtained as necessary. In addition, the clearance and position module 602 calculates net and offset positions by clearing member (house, customer and total). These positions can also be printed at 608 and 610 to have a written report. Thus, clearance and position module 602 verifies position limits and open positions by commodity and members.

In addition, clearance and position module 602 forwards positions through the margin processing module 612 on line 614 for margin calculation. Again, the margin limits are established through control terminal 50 which couples an output on line 616 to the margin processing module 612 for establishing those limits. At that point, the margin processing module 612 calculates original (initial) and variation margin requirements. It also calculates advance and special margin requirements which have been entered through control terminal 50. It summarizes margin requirements by clearing member and house/customer activity. This data can then be forwarded on line 618 to the financial and report module 620 which prepares clearing reports for clearing corporation members and the exchange. It provides a trade register, position and margin summary and the like. It updates the bank account and provides information for reconciliation module 622. It also prints the clearing reports at 624 where written reports are desired. These written reports can be made available to the exchange itself, to members of the exchange, and to the CFTC.

Figure 17:
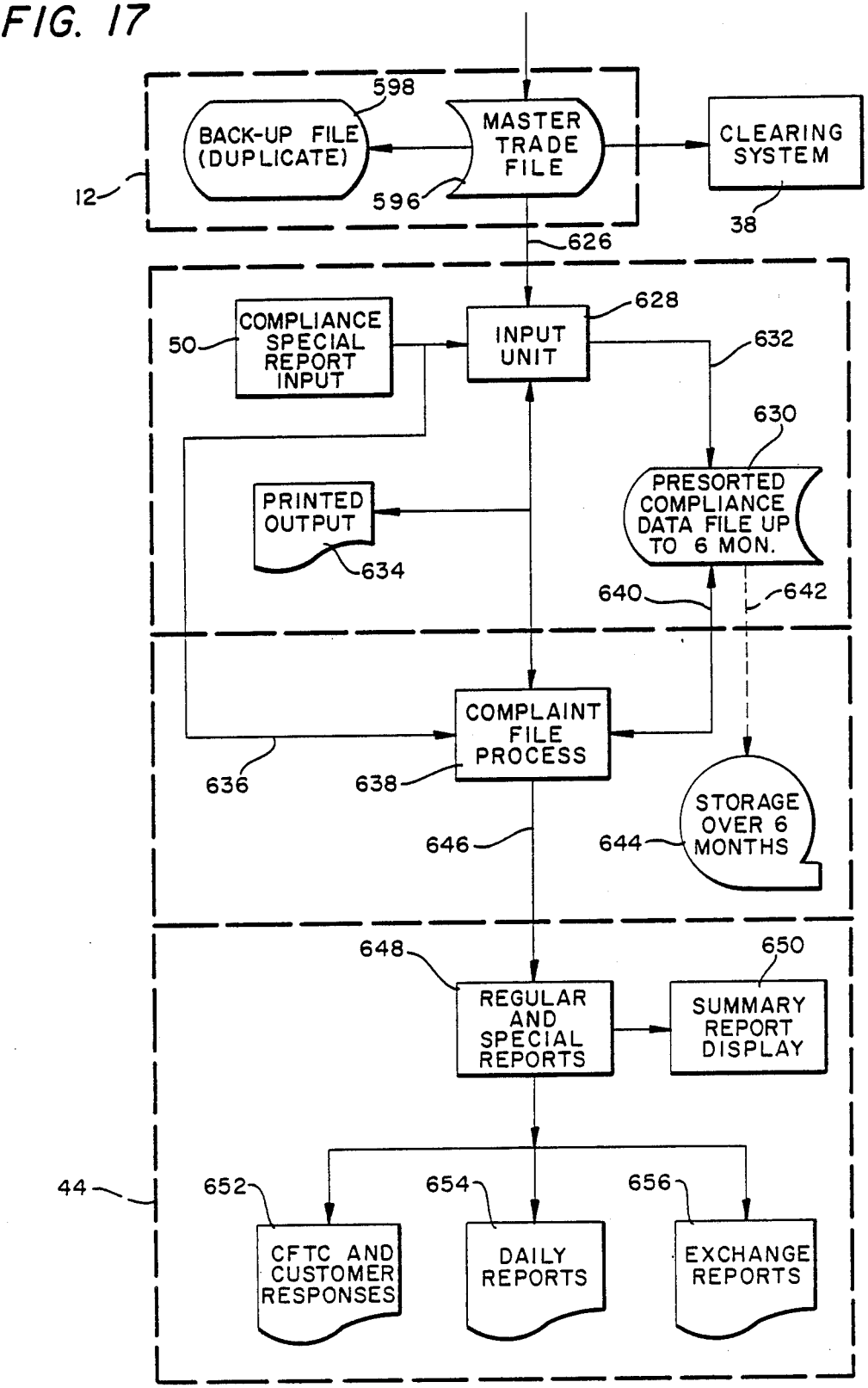
FIG. 17 is a detailed diagrammatic representation of the compliance system as well as its association with the trading system and the clearing system.

FIG. 17 is a detailed diagrammatic representation of the compliance system 44 as well as its association with the trading system 12 and the clearing system 38 as shown in FIG. 16.

The compliance system 44 establishes predetermined criteria necessary to detect illegal trade practices or trade patterns which would adversely affect the commodity market and automatically compares the transaction data with the predetermined criteria thereby enabling detection of any such illegal trade practices or trade patterns. It also records various reports of members as described hereafter and provides reports to the CFTC as required.

The input to compliance system 44 on line 626 is received from the trading system 12. Since the compliance system is intended to ensure that no manipulations of the market are occurring, it receives all order and trade related data at input unit 628 and sorts the data by major category such as the trader, clearing member, contract, price and time of buy or sell. That information is coupled to memory 630 on line 632 for storage and thus a standard file is built up by major category for retrieval or analysis. If for any reason any of that information needs to be checked to ensure that no irregularities are occurring in the market, the requested data is entered through a keyboard of inquiry/control terminal 50 and the information is either displayed or printed as an output at 634. In addition, if there are complaints by customers, traders, and the like, that information is entered through keyboard 50 and coupled through lines 636 to complaint file 638. Those complaints are stored and if the enforcement staff needs to make inquiries concerning those complaints they can enter a retrieval input through keyboard 50 and the particular complaint access can be printed or displayed at 634. Also, those complaints are coupled through line 640 to the data file 630 where they are stored for up to 6 months. Any information over 6 months is coupled through line 642 to storage 644 for longer storage. The complaint file storage 644 maintains a tape record of all transfers over 6 months old in predetermined format. Also, it can notify staff of the aging of complaints through the printer 634 and monitor any responses from the staff.

Finally, the information stored in the complaint file 638 can be coupled through line 646 to unit 648 which prepares daily and monthly reports. They can be displayed on screen 650 and distributed as necessary in the form of a hard copy to the CFTC and the customers at 652. The daily reports can be printed at 654 and the reports for use by the exchange can be printed at 656. Thus, the compliance system 44 time sorts all trade activities, provides trader/member reports, keeps a detailed history of all the trading activities of any trader/member, enables special programs to be activated in order to detect any unusual patterns of trading, provides data on crossed trades including transfer of positions and trading irregularities, provides an early warning when trading data illustrates some irregularity, keeps track of the members financial positions by maintaining information on fiduciary status, provides an analysis of any risk which may accompanying any particular type of trade based on the members financial capabilities, and amount of trades and also provides an audit checklist so that any trading pattern histories can be reviewed and followed up.

Figure 18:
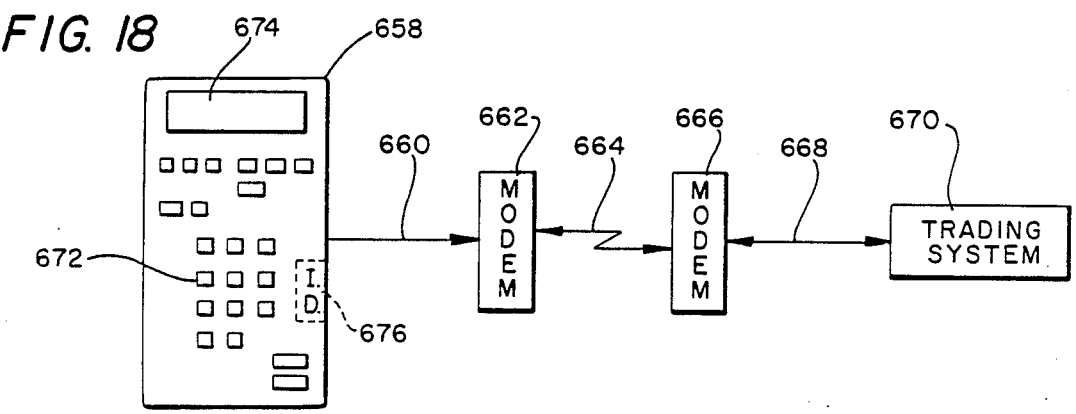
FIG. 18 is a diagrammatic representation of a portable terminal coupled to the trading system for communicating buy, sell and trade information to and from the trading system.
Figure 2:
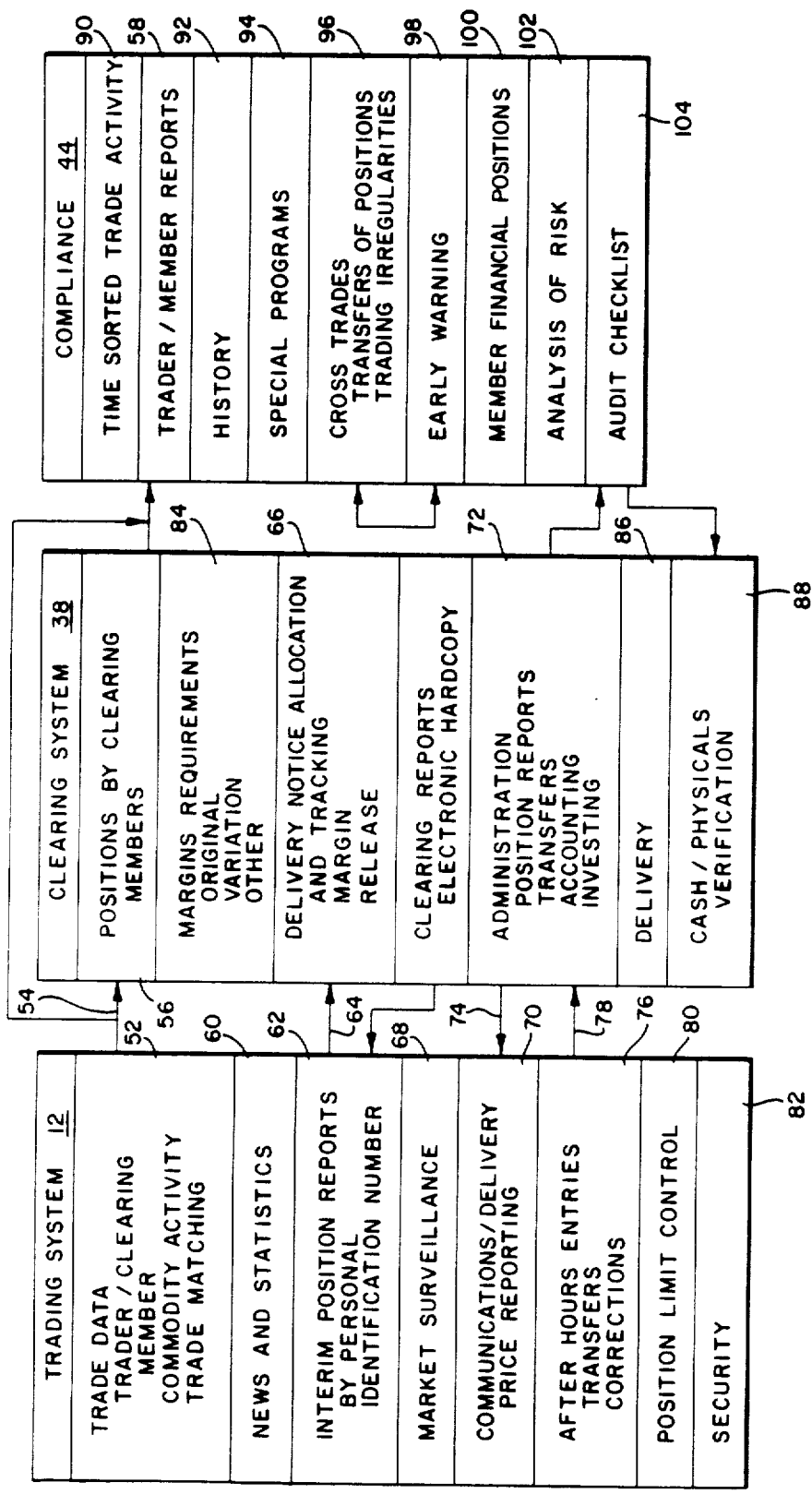

FIG. 18 is a diagrammatic representation of a portable terminal coupled to the trading system for communicating buy, sell and trade information to and from the trading system by telephone. The portable terminal 658 is shown coupled through line 660 to modem 662 which translates the information into data sufficient for transmission on telephone line 664 to the trading system modem 666 which produces an output on line 668 and is coupled to the trading system 670. The modem 658 includes a keyboard 672, a display 674 and an identification circuit 676. This system enables the trader to carry a portable terminal to some location apart from his remote terminal and allows him to communicate with the trading system over the phone lines to determine the highest bid made, the lowest offer made and the last trade price of a particular commodity. The information received from the trading system is displayed so that he can make the proper decision. He can then make an offer or bid at a price he selects or at the market price. The bid or offer which the user makes is also displayed. When he is satisfied with the offer or bid he wants to make, he can enter the data which is then transmitted to the trading system 670. The trading system 670 first inspects the identification number which is transmitted from the portable terminal 658 and if the identification number is acceptable, the trading system will either return the requested data to the remote terminal or accept the transmitted data from it.

Figure 19:
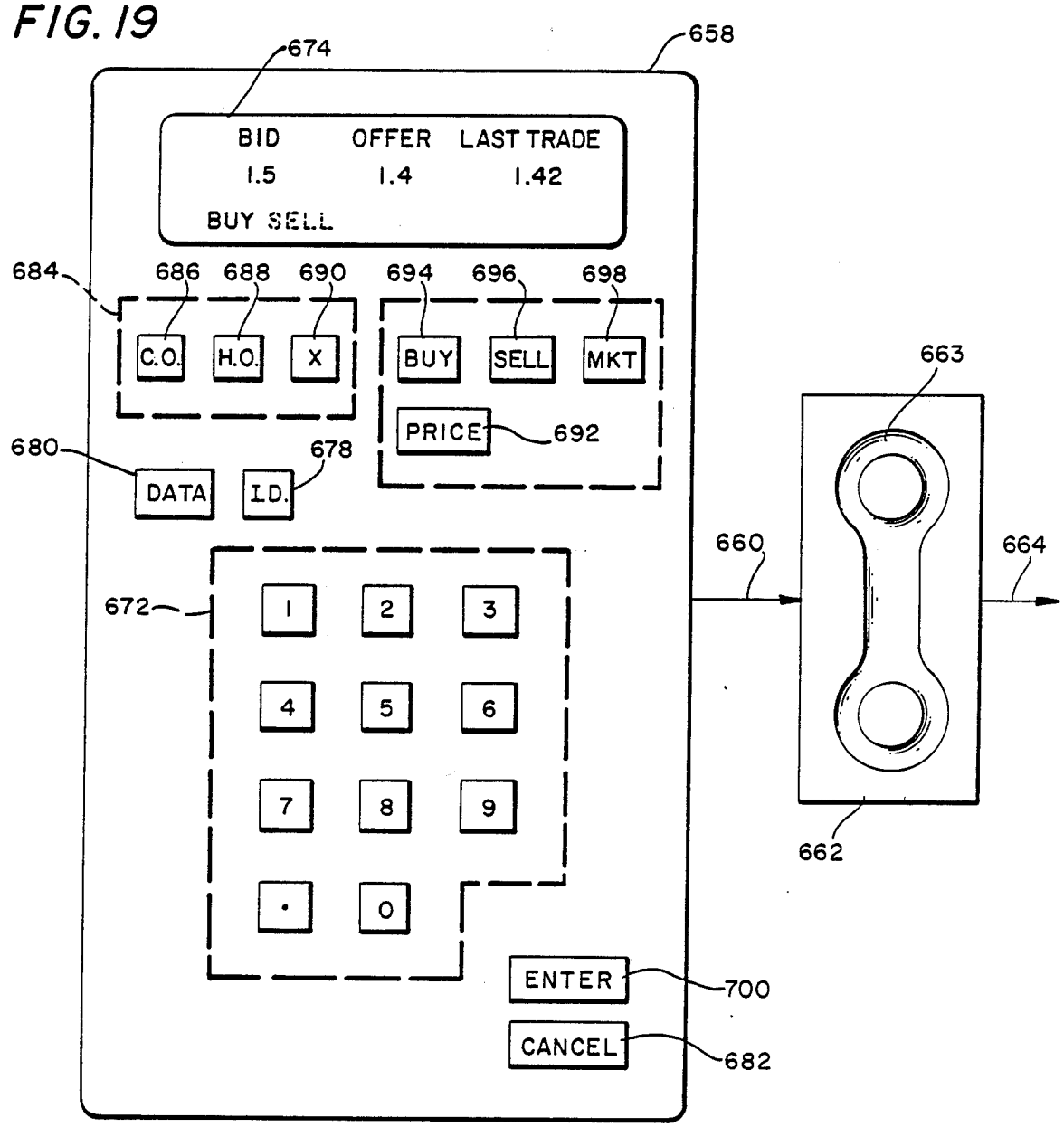
FIG. 19 is a schematic representation of the portable terminal itself illustrating the details thereof.

FIG. 19 is a schematic representation of the portable terminal itself illustrating the details thereof.

The portable terminal 658 includes a display 674 and a numerical entry keyboard shown generally at 672. When it is desired to communicate with the trading system 670, a telephone receiver is placed in a cradle 663 in modem 662. An access code must be dialed on the telephone to reach the trading system 670. When the trading system 670 receives the access code, it returns a signal to the remote terminal 658 indicating that it is ready to receive information. If the user desires to know the current bid price, offer price and last trade price of a particular commodity, he simply depresses I.D. key 678 which transmits the identification code in this particular portable terminal 658 to the central processor. If the central processor recognizes the identification number, it sends back a signal (not shown) to indicate on the display that it is ready to receive or send requested data. The operator then depresses the desired commodity button 686, 688 or 690 and data switch 680 and the information requested is transmitted by the trading system 670 to the portable terminal 658.

If the user then wishes to make a bid or an offer, he simply depresses the cancel button 682 and the information on the display disappears. Again, he first depresses key 678 to establish his identity. He then depresses one of the commodity buttons shown generally at 684 which could include, for instance, crude oil button 686, heating oil button 688 or any other like commodity button 690 generally designated in the drawing by the letter X. He then depresses the appropriate keys 672 to determine price of the bid or offer which is displayed on display 674, then depresses price button 692 and buy button 694 or sell button 696 depending upon the transaction. He also may depress market button 698 to indicate that he wants to purchase at the market price rather than establishing any particular price through keyboard 672. When he has taken those steps and is satisfied with the entry shown on the display indicating that he is buying or selling a particular type cf commodity at a particular price, he then depresses Enter button 700 which causes the data to be transmitted on line 660 to modem 662 where it passes over the telephone lines 664 to the trading system 670. If an invalid identification number is transmitted, the computer returns a not accepted message because of invalid identification. If the identification number is accepted, and if the buy or sell transaction can be completed, the trading system 670 notifies the remote portable terminal 658 on the display 674. However, the actual transaction is recorded at the remote terminal of the trader which is fixed at his normal location for storage purposes. The remote terminal 658 does not include available storage to keep track of that kind of information. It simply allows transaction data to be reviewed and a buy or sell trade to be made and the resulting buy or sell, if any, is recorded in the trader's fixed terminal at its particular location. Since it will have the same identification number as the remote portable terminal 658, the computer can so distinguish and send the information for storage o the proper fixed terminal.

Thus, there has been disclosed an automated futures exchange trading system in which all remote terminals that are associated with the exchange are given an identification number. These terminals can communicate with the central processor of the exchange system which validates the terminal input, cues the orders being received by time, size and commodity, executes matching bids and offers and clears trades simultaneously, reports the last sale by time, quantity and price according to commodity, reports bids/offers as they are received, notifies traders of filled or unfilled orders, reports various market conditions and transaction to the remote terminals for use by the traders, maintains a detailed trade history of each member of the exchange and provides the necessary trade data for settlement and compliance. This unique system provides accurate and precise information, trading based on factual data, assurance of execution and immediate confirmation, control through real time processing of information and surveillance, and the use of computer hardware to implement the process.

While the invention has been described in connection with a preferred embodiment, it is not intended to limit the scope of the invention to the particular form set forth, but, on the contrary, it is intended to cover such alternatives, modifications, and equivalents as may be included within the spirit and scope of the invention as defined in the appended claims.

I claim:

1. A computerized open outcry exchange system for transacting sales of a particular futures commodity contract in varying volumes or lot sizes by members of a futures trading exchange as principals or agents for others wherein bids to purchase or offers to sell said particular commodity contract are made by said principals or agents through remote terminals, said system comprising:
   a. means for receiving and storing bids and offers from said remote terminals and automatically completing a transaction of matching bids and offers on a first-come, first-served basis thereby establishing a trading system,
   b. means for storing CFTC requirements and regulations to be observed on said buy and sell transactions thereby establishing a clearing system,
   c. means coupling said stored CFTC requirements and regulations in said clearing system to said trading system for comparing said transaction with said stored requirements and regulations thereby determining the validity of each transaction,
   d. means for storing predetermined compliance criteria necessary to detect illegal trade practices or trade patterns which would adversely affect said commodity market thereby establishing a compliance system, and
   e. mean coupling said stored compliance criteria in said compliance system to said trading system and said clearing system for automatically comparing said transaction determined to be valid to said predetermined compliance criteria thereby enabling detection of illegal trade practices and trade patterns which would adversely affect said commodity market.

2. A system as in claim 1 further including:
   a. means in said remote terminals for identifying by code said member, as agent or a principal, making said bid or offer, and
   b. a central processor in said trading system having means for recording said identify code whereby said agent or principal may be identified.

3. A system as in claim 2 further including:
   a. means in said central processor for storing relevant information relating to each received bid or offer including prioritizing each received bid or offer on the basis of price, lot size and time received by said central processor, said
   b. display means in said remote terminals coupled to said central processor for receiving said prioritized bids and offers and displaying at least a part of all bids in descending price order and all offers in ascending price order.

4. A system as in claim 3 further including:
   a. a movable cursor on said remote terminal display for identifying said member's bid or offer, and
   b. keyboard means in said remote terminal for modifying said member's bid or offer identified by said movable cursor by entering data through said keyboard modifying said selected bid or offer.

5. A system as in claim 2 further including:
   a. means coupled to said recording means in said central processor for accessing relevant information relating to at least a part of said stored bids and offers for a particular commodity contract, and
   b. means coupled to said accessing means for determining the breadth of the market for that commodity contract by displaying the number of bids for any particular number of offers based on said relevant information.

6. A system as in claim 2 further including:
   a. means coupled to said recording means in said central processor for accessing relevant information relating to said stored bids and offers for a particular commodity contract, and
   b. means coupled to said accessing means for displaying bid or offer lot sizes, last sales price, daily price ranges, and volume of trades of said commodity contracts occurring over any predetermined period of time.

7. A system as in claim 6 wherein said display means displays the variations in lot size, last sales price, daily price ranges, and volumes of trades of said commodity contracts that occur between various ones of said predetermined periods of time.

8. A system as in claim 2 further including printing means at each remote terminal coupled to said central processor for printing the execution of each transaction initiated by a particular terminal including date, time, lot size and price of said commodity contract.

9. A system as in claim 2 further including:
   a. means in said central processor for establishing trading limits in dollar volume for any particular remote terminal, and
   b. means in said clearing system coupled to said remote terminals for rejecting any bid or offer from said remote terminal that exceeds the trading limits established for each of said terminals.

10. A system as in claim 2 further including:
    a. means in said compliance system for accessing said storage means in said central processor, and
    b. means coupled to said accessing means for detecting patterns of trading which may be manipulative by displaying times of receipt of said bids and offers, the agent or principal making said trades, or the history of trading of said agent or principal.

11. A system as in claim 2 further including:
    a. a printer coupled to said central processor, and
    b. means selectively coupling said central processor storage to said printer for printing the volume of trading of any commodity contract over any predetermined period of time.

12. A system as in claim 2 further including:
    a. a portable hand-held terminal for receiving and generating buy and sell data for features commodity contracts,
    b. a modem coupled to said portable hand-held terminal for converting said generated data to information capable of being transmitted to said trading system and converting said received data to information capable of being used by said portable terminal, and c. telephone lines coupling said modem converted information to and from said trading system.

13. A system as in claim 12 wherein said portable hand-held terminal further comprises:
   a. a display,
   b. a keyboard containing commodity keys, buy and sell keys, numerical entry keys and control keys,
   c. means for generating said member identification code uniquely identifying a particular hand-held terminal, and
   d. means for storing said transaction in said member remote terminal and only displaying said transaction at said portable terminal.

14. An automated system for transacting a sale of a particular futures commodity contract in predetermined volumes or lot sizes by members of the trading system as principals or agents for others wherein bids to purchase or offers to sell are made by said principals or agents for said particular commodity contract, said system comprising:
   a. remote terminals for initiating and transmitting transaction data including buyer's bids and seller's offers,
   b. a central processor for receiving said buyer's bids and seller's offers thereby forming a trading system,
   c. means in said central processor for completing a transaction by comparing received bids with received offers to find a matching bid and offer,
   d. means coupled to said trading system and said remote terminals for storing predetermined trading constraints and approving only those bids and offers coming within said constraints thereby forming a clearing system,
   e. means coupled to said trading system and said clearing system for storing predetermined criteria representing fraudulent trading practices and comparing said transaction data with said predetermined criteria thereby establishing a compliance system for enabling detection of said fraudulent trading practices, and
   f. means in said central processor for notifying the remote terminals of a completed transaction when a matched bid and offer are found.

15. A system as in claim 14 further including:
   a. a storage means in said central processor and
   b. means coupled to said storage means for storing said received bids and offers according to time, price and lot size for a particular commodity contract.

16. A system as in claim 15 further including:
   a. means in said central processor for matching said bids and offers on a priority basis where first received bids and first received offers are matched, and
   b. means coupled to said matching means for completing said transaction of said matched bids and offers on a first received in time basis.

17. A system as in claim 14 wherein said received bids and offers are stored in respective memory queues according to commodity contract by time, lot size, and price.

18. A system as in claim 17 further including means in said central processor for reporting to said remote terminals last sales of a commodity contract by time, lot size, and price.

19. A system as in claim 17 further including means in said central processor for reporting to said remote terminals bids and offers by type of commodity contract as received by time, quantity, and price.

20. A system as in claim 17 further including means in said central processor for notifying remote terminals of filled and unfilled orders.

21. A system as in claim 17 further including memory means in said central processor for maintaining a complete trading history of each trading system member.

22. A system as in claim 14 further including:
   a. means for identifying each exchange member by an electronic code,
   b. means in said clearing system for storing limits of trade for each member, and
   c. means in said central processor coupled to said trade limit storing means and said exchange identifying means for rejecting any proposed trade from a member that exceeds the established position limits.

23. A method of transacting a sale of a particular futures commodity in varying volumes or lot sizes by members of a futures trading exchange as principals or agents for others wherein bids to purchase or offers to sell are made by said principals or agents for said particular commodity, said method comprising the steps of:
   a. receiving in a central processor buyer bids and seller offers on a particular commodity from remote terminals,
   b. storing in said central processor said bids and offers in the form of time, price and lot size of each of said received bids and offers,
   c. comparing said received bids and offers and matching equal bids and offers on a first cone, first served basis according to the time of receiving said bids and offers thereby storing a trading system,
   d. storing buy and sell constraints on each member of said exchange thereby forming a clearing system,
   e. coupling said clearing system to said trading system for approving execution of a transaction only when said transaction falls within said predetermined buy and sell constraints,
   f. executing the buy and sell transaction for a particular commodity for which said offer and bid have been matched and approved by said clearing system,
   g. storing predetermined compliance criteria necessary to detect illegal trade practices thereby forming a compliance system,
   h. coupling said compliance system to said trading system and said clearing system for detecting any illegal trade practices as indicated by said stored predetermined criteria, and
   i. confirming the execution of an approved transaction immediately to both buyer and seller at the remote terminals whose bid and offer are matched.

24. A method as in claim 23 further comprising the steps of:
   a. identifying by code at said remote terminals whether an agent or a principal has made said bid or offer, and
   b. recording said identity code in said central processor whereby said agent or principal may be identified.

25. A method as in claim 24 further comprising the steps of:
   a. prioritizing each received bid or offer on the basis of price, lot size and time received by said central processor, and b. receiving said prioritized bids and offers and displaying all bids in descending price order and all offers in ascending price order.

26. A method as in claim 25 further comprising the steps of:
   a. providing a keyboard and a movable cursor on said remote terminal display,
   b. modifying a bid or offer by moving said cursor to said displayed bid or offer, and
   c. entering modifying data through said keyboard.

27. A method as in claim 24 further including the step of printing the execution of each transaction initiated by a particular remote terminal coupled to said central processor including date, time, lot size and price of said transaction and the name of the other member completing said transaction.

28. A system as in claim 24 wherein said step of detecting illegal trade practices comprises:
   a. accessing said storage means in said central processor, and
   b. displaying times of receipt of said bids and offers, the agent or principal making said trades, and the history of trading of said agent or principal whereby illegal trade practices are made manifest.

29. A method as in claim 23 further comprising the steps of:
   a. accessing said stored bids and offers for a particular commodity, and
   b. determining the breadth of the market for that commodity by displaying the number of bids for any particular number of offers.

30. A method as in claim 23 further comprising the steps of:
   a. accessing said stored bids and offers for a particular futures commodity, and
   b. displaying bid or offer lot sizes, last sales price, daily price ranges, and volume of trades of said futures commodity occurring over any predetermined period of time.

31. A method as in claim 30 further including the step of displaying the variations in lot size, last sales price, daily price ranges, and volumes of trades of said commodity that occur between various ones of said predetermined periods of time.

32. A method as in claim 23 further comprising the steps of:
   a. storing in at said central processor trading limits in dollar volume for any particular remote terminal, and
   b. rejecting any bid or offer from any said remote terminal that exceeds the stored trading limits for each of said terminals.

33. A method as in claim 24 further comprising the steps of:
   a. coupling a printer to said central processor, and
   b. selectively coupling said central processor storage to said printer for printing the volume of trading of any commodity over any particular period of time.

34. A method of storing an automated futures trading system for transacting a sale of a particular commodity in predetermined volumes or lot sizes by members of the trading system as principals or agents for others wherein bids to purchase or offers to sell said particular commodity are made by said principals or agents, said method comprising the steps of:
   a. initiating and transmitting buyer's bids and seller's offers from remotely terminals,
   b. determining whether said buyer's bids and seller's offers are valid,
   c. comparing received valid bids with received valid offers to find a matching bid and offer on a first-come, first-served basis,
   d. reviewing said valid bids and offers to detect illegal trading practices, and
   e. notifying the remote terminals of a completed transaction when a matched bid and offer are found.

35. A method as in claim 34 further comprising the steps of:
   a. forming a storage means in said central processor, and
   b. storing said received bids and offers according to time, price and lot size for a particular commodity in said storage means.

36. A method as in claim 35 further comprising the steps of:
   a. matching said bids and offers stored in said central processor on a priority basis where first received bids and first received offers are matched, and
   b. completing said transaction of said matched bids and offers on a first received in time basis.

37. A method as in claim 34 further including the step of storing said received bids and offers in respective memory queues according to time, lot size, price and commodity.

38. A method as in claim 37 further comprising the step of reporting to said remote terminals last sales by time, lot size, price and commodity.

39. A method as in claim 37 further comprising the step of reporting to said remote terminals bids and offers as received by time, lot size, price and commodity.

40. A method as in claim 37 further comprising the step of notifying remote terminals of filled and unfilled orders.

41. A method as in claim 37 further comprising the step of maintaining a complete trading history of each trading system member.

42. A system as in claim 34 further comprising the steps of:
   a. identifying each exchange member by an electronic code,
   b. establishing limits of trade for each member, and
   c. rejecting any proposed trade from a member that exceeds the established position limits.

* * * * *

UNITED STATES PATENT AND TRADEMARK OFFICE
CERTIFICATE OF CORRECTION

PATENT NO. : 4,903,201

DATED : Feb. 20, 1990

INVENTOR(S) : Susan W. Wagner

It is certified that error appears in the above-identified patent and that said Letters Patent is hereby corrected as shown below:

The title page should be deleted to appear as shown on the attached title page.

The sheets of drawing, consisting of Figs. 1 - 19, should be added as shown on the attached sheets.

Signed and Sealed this

Third Day of July, 1990

Attest:

HARRY F. MANBECK, JR.

*Attesting Officer*    *Commissioner of Patents and Trademarks*

United States Patent [19]

Wagner

[11] Patent Number: 4,903,201
[45] Date of Patent: Feb. 20, 1990

[54] AUTOMATED FUTURES TRADING EXCHANGE

[75] Inventor: Susan W. Wagner, Dallas, Tex.

[73] Assignee: World Energy Exchange Corporation, Dallas, Tex.

[21] Appl. No.: 548,319

[22] Filed: Nov. 3, 1983

[51] Int. Cl.⁴ .................................................. G06F 15/30
[52] U.S. Cl. ................................. 364/408; 364/918.8; 364/900
[58] Field of Search ............... 364/200, 900, 300, 408; 340/825.26; 235/375

[56] References Cited

U.S. PATENT DOCUMENTS

| | | | |
|---|---|---|---|
| 3,253,263 | 5/1966 | Lee et al. | 340/172 S |
| 3,573,747 | 4/1971 | Adams et al. | 364/200 X |
| 3,581,072 | 5/1971 | Nymeyer | 235/152 |
| 3,594,503 | 7/1971 | Wolf et al. | 178/88 |
| 3,596,254 | 7/1971 | Highleyman et al. | 340/172.5 |
| 3,652,795 | 3/1972 | Wolf et al. | 179/2 DP |
| 3,753,233 | 8/1973 | Cardell, Jr. | 340/172.5 |
| 3,770,941 | 11/1973 | Gechele et al. | 235/61.7 R |
| 3,848,233 | 11/1974 | Lotan et al. | 364/200 X |
| 3,974,480 | 8/1976 | Gernelle | 364/200 |
| 3,976,840 | 8/1976 | Cleveland | 179/2 DP |
| 4,032,946 | 6/1977 | Wakatsuki et al. | 364/900 |
| 4,264,782 | 4/1981 | Konheim | 364/200 X |
| 4,275,456 | 6/1981 | Tanaka et al. | 364/900 |
| 4,321,672 | 3/1982 | Braun et al. | 364/408 |
| 4,334,270 | 6/1982 | Towers | 364/300 |
| 4,346,442 | 8/1982 | Musmanno | 364/408 |
| 4,376,978 | 3/1983 | Musmanno | 364/408 |
| 4,412,287 | 10/1983 | Braddock, III | 364/408 |
| 4,554,418 | 11/1985 | Toy | 364/900 |

OTHER PUBLICATIONS

*Wall Street Journal*, "Amex, Toronto Exchange Develop a Plan to Link Trading Floors Electronically", date not known.
*Info World*, "Buying Stocks On-Line", 9/17/84, pp. 31–32.
"Trading System Falling Apart; Will Exchanges Automate?", undated article from magazine of unknown origins.

Primary Examiner—Jerry Smith
Assistant Examiner—Jon D. Grossman
Attorney, Agent, or Firm—Sigalos, Levine & Montgomery

[57] ABSTRACT

A computerized open outcry exchange system for transacting sales of a particular futures commodity contract by members of a futures trading exchange wherein bids to purchase or offers to sell the particular commodity contract are made by the members through remote terminals and the exchange computer automatically matches offers and bids to complete the transaction.

42 Claims, 14 Drawing Sheets

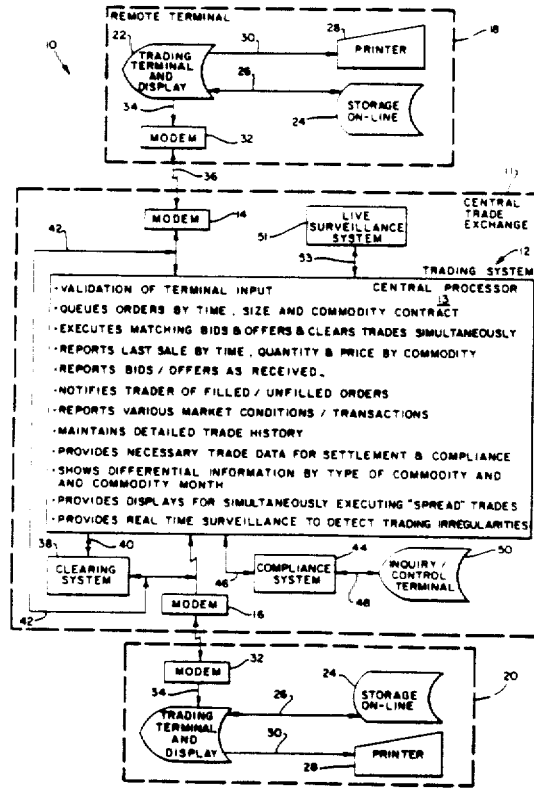

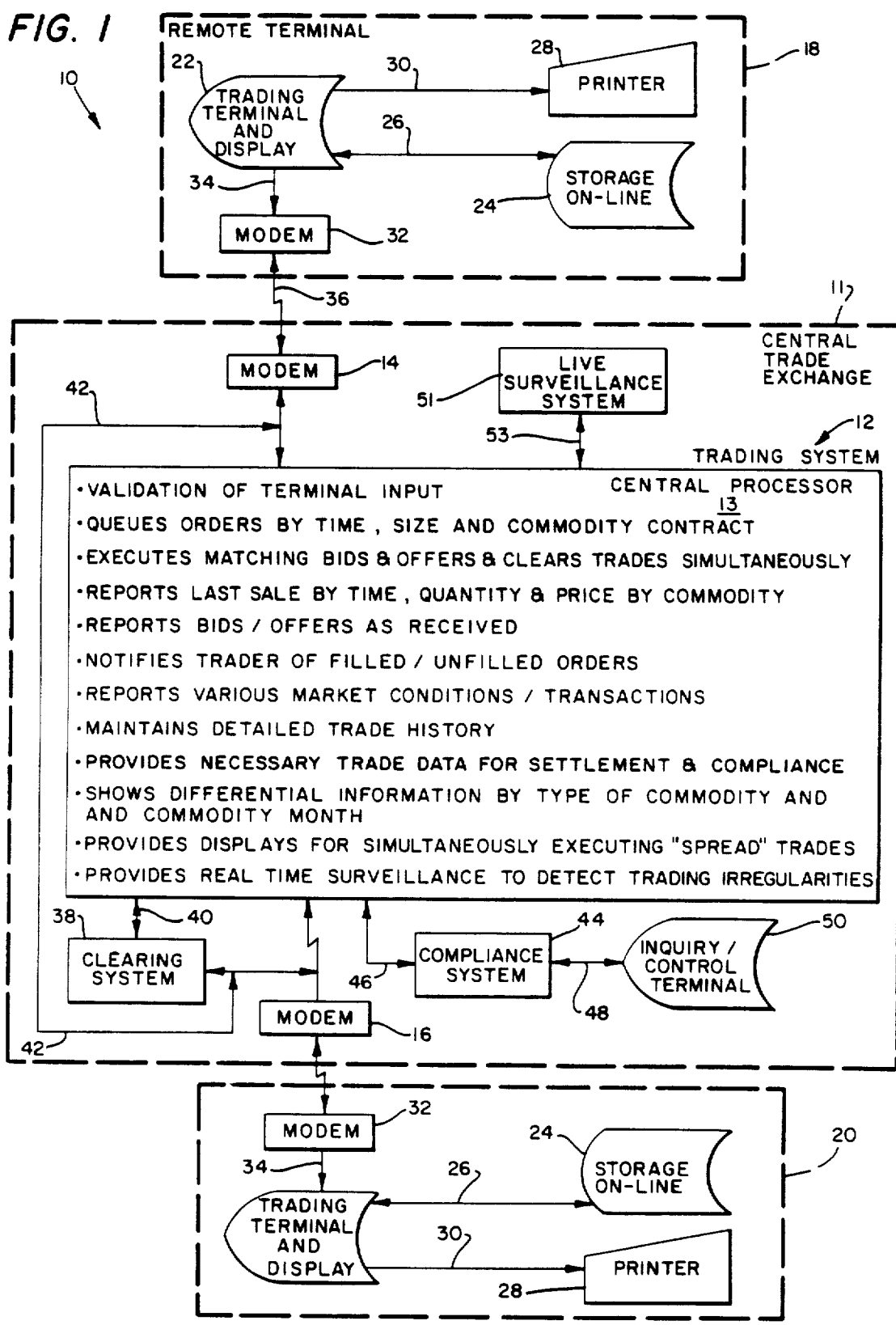

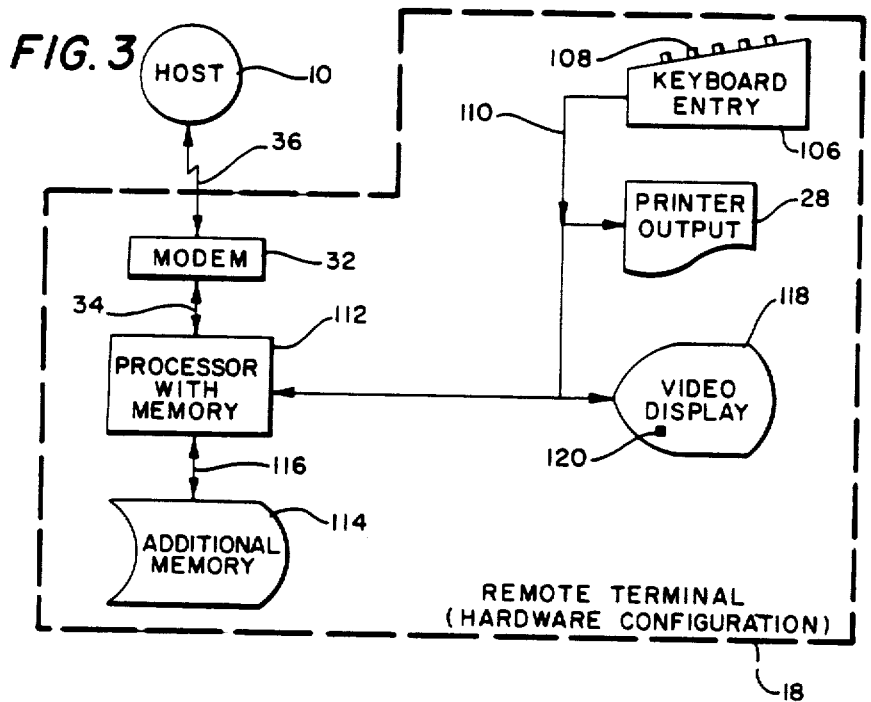
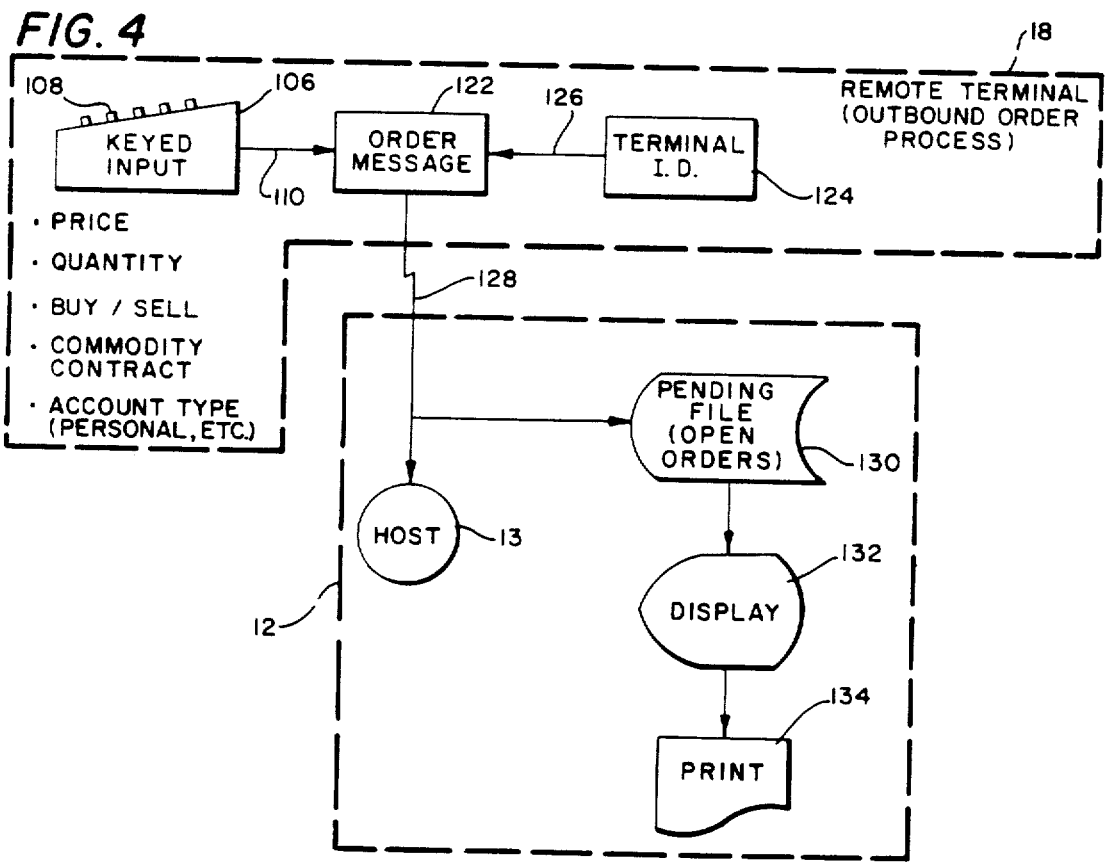

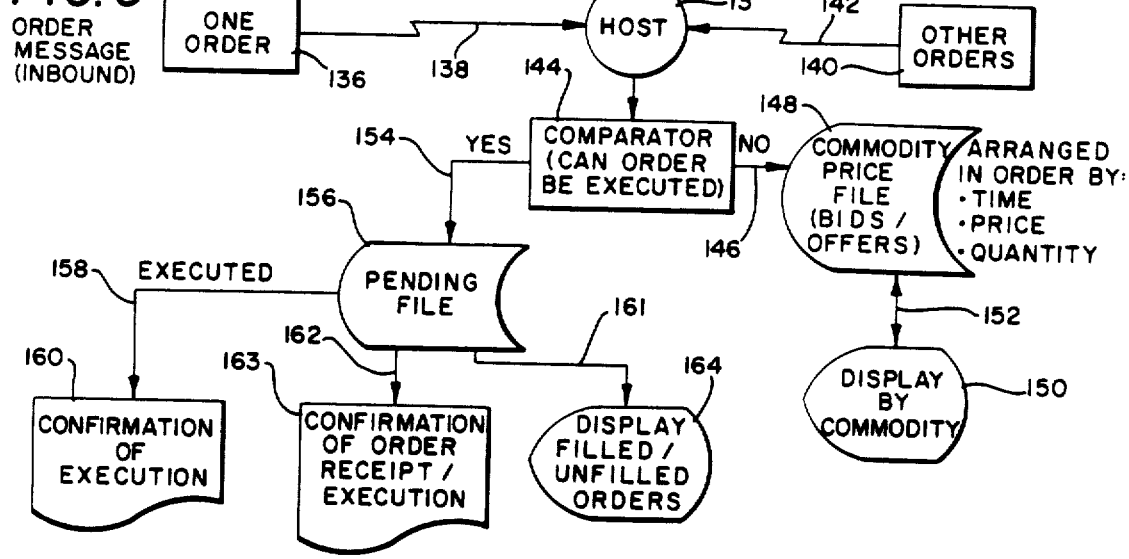
FIG. 5 ORDER MESSAGE (INBOUND)
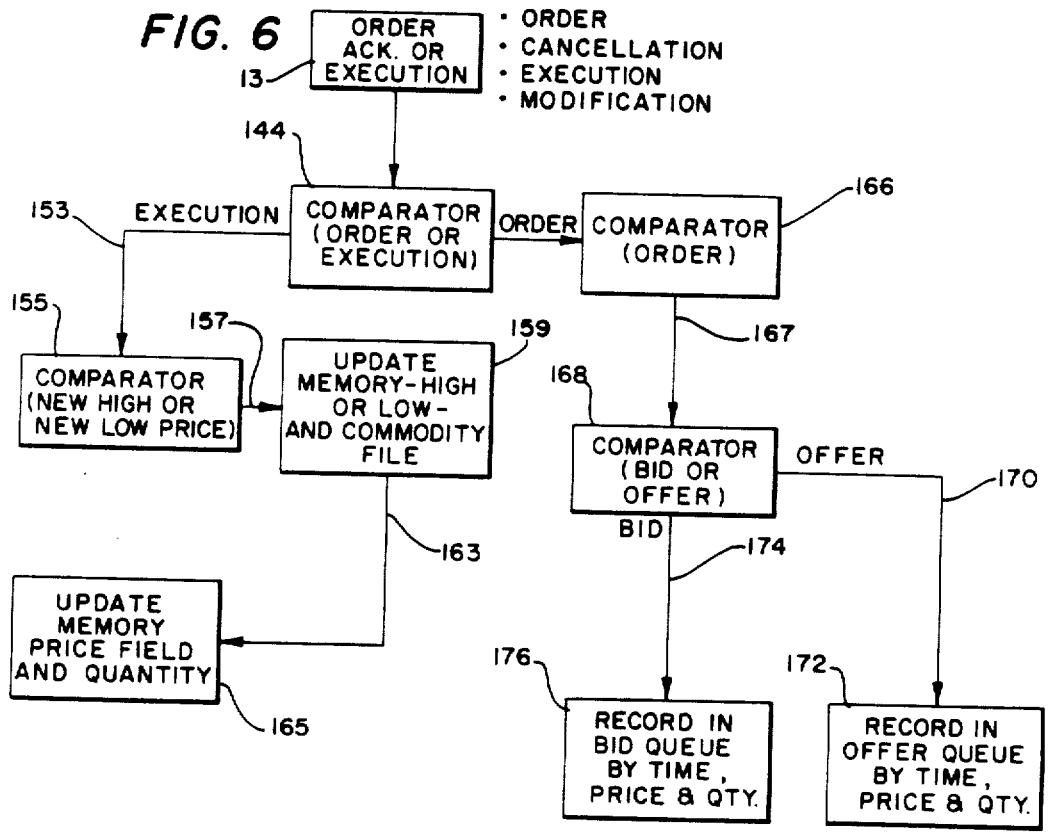
FIG. 6

ORDER QUEUE-HOST

AUTOMATIC UPDATING PROCESS-HOST

PRICE REPORTING PROCESS